United States Patent
Garyali et al.

(10) Patent No.: US 8,245,239 B2
(45) Date of Patent: Aug. 14, 2012

(54) DETERMINISTIC RUNTIME EXECUTION ENVIRONMENT AND METHOD

(75) Inventors: Piyush Garyali, Bangalore (IN); Ziad M. Kaakani, Scottsdale, AZ (US); Keijo J. Manninen, Varkaus (FI); Pratap Parashuram, Bangalore (IN); Elliott H. Rachlin, Scottsdale, AZ (US); Jethro F. Steinman, Havertown, PA (US); Vivek B. Varma, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 1788 days.

(21) Appl. No.: 11/175,848

(22) Filed: Jul. 6, 2005

(65) Prior Publication Data

US 2007/0011660 A1    Jan. 11, 2007

(51) Int. Cl.
*G06F 9/46* (2006.01)
*G06F 13/00* (2006.01)

(52) U.S. Cl. ........ 718/107; 718/100; 718/101; 718/104; 711/170; 711/171; 711/172; 711/173

(58) Field of Classification Search ............. 718/1, 101, 718/102, 104, 107, 100, 103; 707/205, 206
See application file for complete search history.

(56) References Cited

U.S. PATENT DOCUMENTS

| | | | |
|---|---|---|---|
| 4,805,134 A | | 2/1989 | Calo et al. |
| 5,218,698 A | | 6/1993 | Mandl |
| 5,542,088 A | * | 7/1996 | Jennings et al. ............ 718/103 |
| 6,105,024 A | * | 8/2000 | Graefe et al. ............... 1/1 |
| 6,286,088 B1 | * | 9/2001 | Campbell et al. ............ 711/165 |
| 6,654,773 B2 | | 11/2003 | Hills |
| 6,766,336 B2 | | 7/2004 | Kawamoto |
| 6,804,765 B2 | | 10/2004 | Kolodner et al. |
| 6,834,386 B1 | * | 12/2004 | Douceur et al. ............ 718/107 |
| 7,263,592 B2 | * | 8/2007 | Michael ....................... 711/170 |
| 2002/0056019 A1 | * | 5/2002 | Kolodner et al. ................ 711/6 |
| 2002/0089994 A1 | * | 7/2002 | Leach et al. .................. 370/412 |
| 2005/0149585 A1 | * | 7/2005 | Bacon et al. ................... 707/205 |
| 2005/0149589 A1 | | 7/2005 | Bacon et al. |
| 2005/0149686 A1 | | 7/2005 | Bacon et al. |
| 2005/0257120 A1 | | 11/2005 | Gorobets et al. |

OTHER PUBLICATIONS

Magnusson et al. "Garbage collection for hard real-time systems", Fourth International Workshop on Object-Orientation in Operating Systems, Aug. 14-15, 1995, pp. 60-63.*
Okehee Goh et al., "Schedulable Persistence System for Real-Time Embedded Applications in CLI," 10 pages, 2005.
Okehee Goh et al., "Schedulable Persistence System for Real-Time Applications in VMs," 10 pages, 2006.
Okehee Goh et al., "Integrated Scheduling with Garbage Collection for Real-Time Embedded Applications in CLI," 8 pages, 2006.
Okehee Goh et al., "A Schedulable Garbage Collection for Embedded Applications in CLI," 10 pages, Aug. 2005.

(Continued)

*Primary Examiner* — Emerson Puente
*Assistant Examiner* — Willy W Huaracha

(57) ABSTRACT

A method includes executing one or more applications in a deterministic execution environment and executing a plurality of background tasks in the deterministic execution environment. The one or more applications and the background tasks are executed in different time slots. At least one of the background tasks cannot be completed within a single time slot. The at least one of the background task is executed incrementally in multiple non-adjacent time slots so as to prevent the at least one background task from interfering with the execution of the one or more applications.

23 Claims, 12 Drawing Sheets

OTHER PUBLICATIONS

Okehee Goh et al., "A Real-Time Garbage Collector for Embedded Applications in CLI," 2 pages, May 2004.

David F. Bacon et al., "The Metronome: A Simpler Approach to Garbage Collection in Real-Time Systems," IBM Research, 20 pages, Nov. 5, 2003.

David F. Bacon et al., "Controlling Fragmentation and Space Consumption in the Metronome," IBM T.J. Watson Research Center, 28 pages, 2003.

David Bacon et al., "A Mostly Non-Copying Real-Time Collector with Low Overhead and Consistent Utilization," IBM T.J. Watson Research, 42 pages, 2003.

David F. Bacon et al., "The Metronome: A Hard Real-Time Garbage Collector," IBM T.J. Watson Research Center, 42 pages, 2003.

David Tarditi, "Compact Garbage Collection Tables," 9 pages, Oct. 2000.

Fridtjof Siebert, "Constant-Time Root Scanning for Deterministic Garbage Collection," 15 pages, 2001.

Hans-Juergen Boehm, Garbage Collection in an Uncooperative Environment, 1988, pp. 1-17.

www.mono-project.com, printed Sep. 2007, 45 pages.

www.hpl.hp.com/personal/Hans-Boehm/gc/index.html, printed Sep. 2007, 6 pages.

www.rtsj.org/specjavadoc/book-index.html, see esp. "Memory Management" Section, 453 pages.

Okehee Goh et al., "A Real-Time Garbage Collection for Embedded Applications in CLI," 15 pages.

* cited by examiner

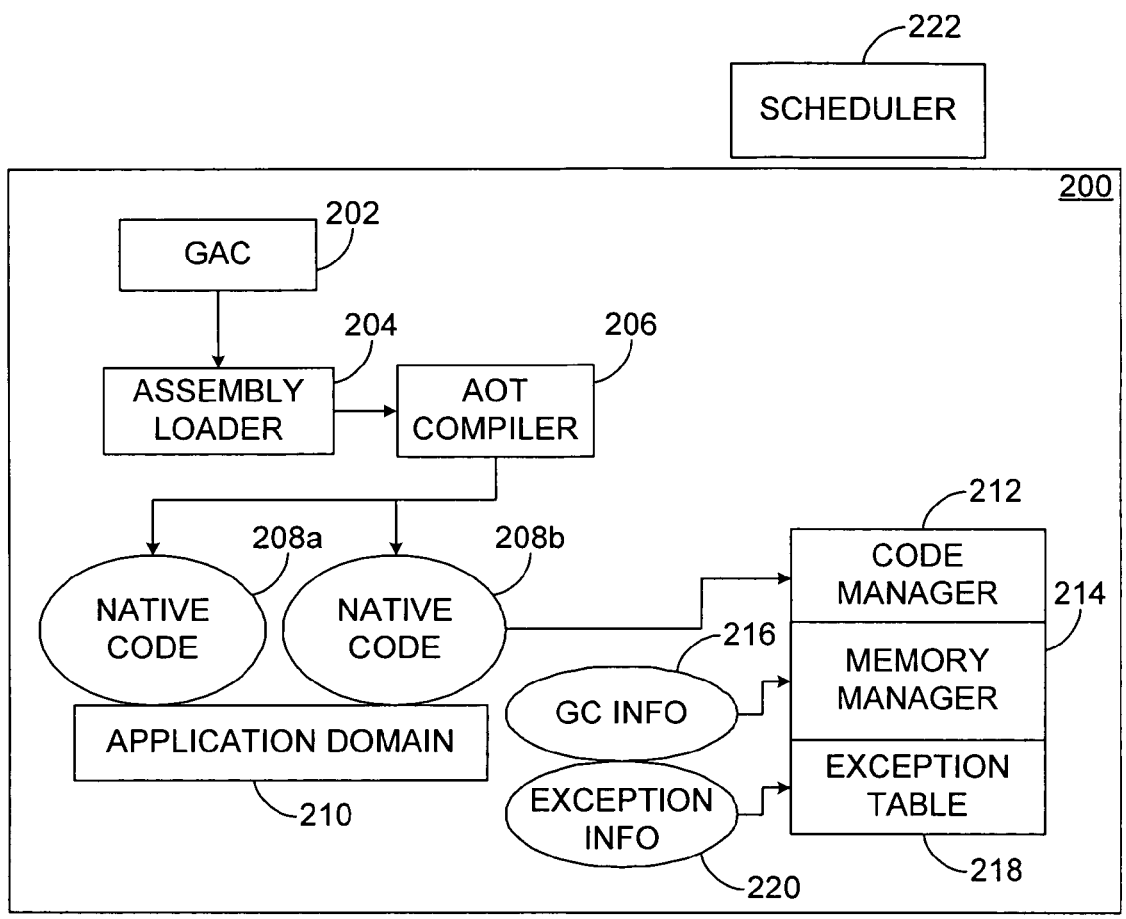
FIGURE 2
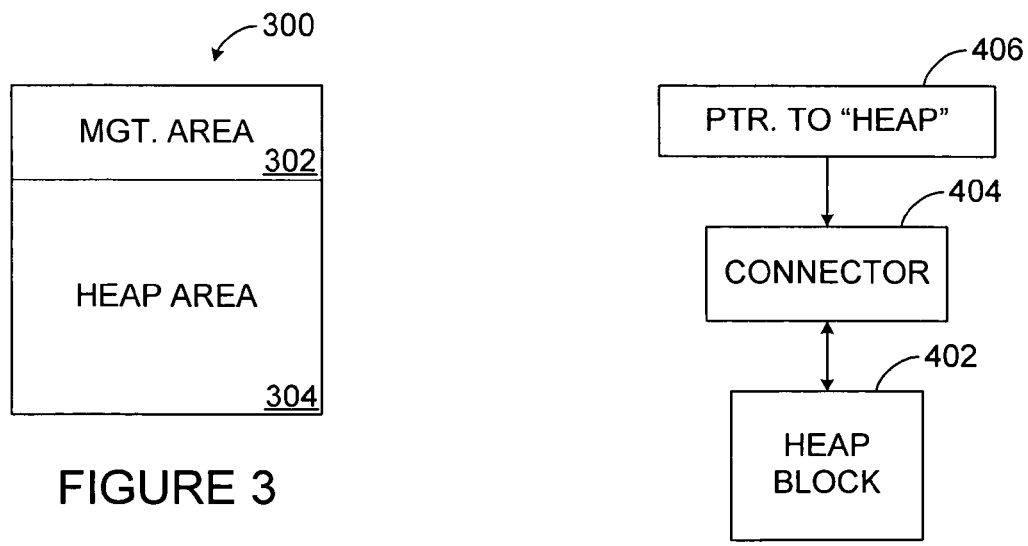
FIGURE 3
FIGURE 4

DETERMINISTIC RUNTIME EXECUTION ENVIRONMENT AND METHOD

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

This application is related to U.S. patent application Ser. No. 11/175,703 entitled "APPARATUS AND METHOD FOR DETERMINISTIC GARBAGE COLLECTION OF A HEAP MEMORY" filed on Jul. 6, 2005 and issued as U.S. Pat. No. 7,962,707, which is hereby incorporated by reference.

TECHNICAL FIELD

This disclosure relates generally to computing systems and more specifically to a deterministic runtime execution environment and method.

BACKGROUND

Several attempts have been made to create "execution environments" in which certain types of computer programs are executed. In general, a conventional execution environment provides support for basic features that many programs assume are available for use. For example, conventional execution environments typically include support for performing various mathematical functions (such as sine and cosine operations) input/output functions (such as reading and writing files), and communication functions (such as network and database access). Some conventional execution environments provide additional functionality, such as just-in-time compilation of code, machine independence and portability, remote operation, and enhanced internetworking. Just-in-time compilation refers to the compilation of code that is performed when execution of the code is requested for the first time. Conventional execution environments that support these additional functions are generally referred to as "virtual machines." The Common Language Infrastructure (CLI) by MICROSOFT CORPORATION and JAVA by SUN MICROSYSTEMS are examples of execution environments.

Conventional execution environments often support the management of memory used during execution of computer programs. Memory is typically a finite resource needing careful management so that programs needing memory can obtain it when necessary. There are often several types or classes of memory in an execution environment, including a "heap memory" or "heap". The heap typically represents memory that is highly dynamic in its use, meaning that heap memory is frequently allocated to programs that use it for a short time and then return it for reuse by other programs. A "heap manager" often controls when and how the heap memory is used by the computer programs.

In some execution environments, programs that request the use of heap memory may not explicitly return it when their use of the heap memory is complete. In these execution environments, the heap manager often automatically determines when heap memory is no longer being used by a program that requested it. The heap manager then reclaims the identified heap memory, allowing the heap manager to allocate the identified memory to another program. This function is typically referred to as "garbage collection."

A problem with conventional execution environments is that they are not deterministic in nature. The term "deterministic" generally refers to the ability to predict or specify the behavior of a program or environment. Conventional execution environments are not deterministic because they typically suffer from occasional and unpredictable delays, including delays associated with the functions performed by the heap manager. These delays represent non-deterministic behavior in the conventional execution environments.

This typically makes these execution environments unsuitable for use with real-time applications. Real-time applications may represent programs that interact with an outside environment or otherwise operate in a way that is carefully timed. The non-deterministic behavior of conventional execution environments often translates into or causes non-deterministic behavior in the execution of real-time applications. As a result, the real-time applications often cannot maintain their exact time schedules when executed in conventional execution environments, which causes the real-time applications to fail.

SUMMARY

This disclosure provides a deterministic runtime execution environment and method.

In one embodiment, a method includes executing one or more applications in a deterministic execution environment and executing a plurality of background tasks in the deterministic execution environment. The one or more applications and the background tasks are executed in different time slots. At least one of the background tasks cannot be completed within a single time slot. The at least one of the background task is executed incrementally in multiple non-adjacent time slots so as to prevent the at least one background task from interfering with the execution of the one or more applications.

In another embodiment, an apparatus includes a deterministic execution environment capable of executing one or more applications and a plurality of background tasks. The one or more applications and the background tasks are executed in different time slots. The apparatus also includes a scheduler capable of scheduling execution of the one or more applications and the background tasks. At least one of the background tasks cannot be completed within a single time slot and is executed incrementally in multiple non-adjacent time slots so as to prevent the at least one background task from interfering with the execution of the one or more applications.

In a third embodiment, a computer program is embodied on a computer readable medium and is operable to be executed by a processor. The computer program includes computer readable program code for executing one or more applications in a deterministic execution environment and executing a plurality of background tasks in the deterministic execution environment. The one or more applications and the background tasks are executed in different time slots. At least one of the background tasks cannot be completed within a single time slot and is executed incrementally in multiple non-adjacent time slots so as to prevent the at least one background task from interfering with the execution of the one or more applications.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIG. 2 illustrates an example execution environment according to one embodiment of this disclosure;

FIG. 3 illustrates an example heap memory according to one embodiment of this disclosure;

FIG. 4 illustrates an example use of a heap memory block in a heap memory according to one embodiment of this disclosure;

DETAILED DESCRIPTION

Figure 1:
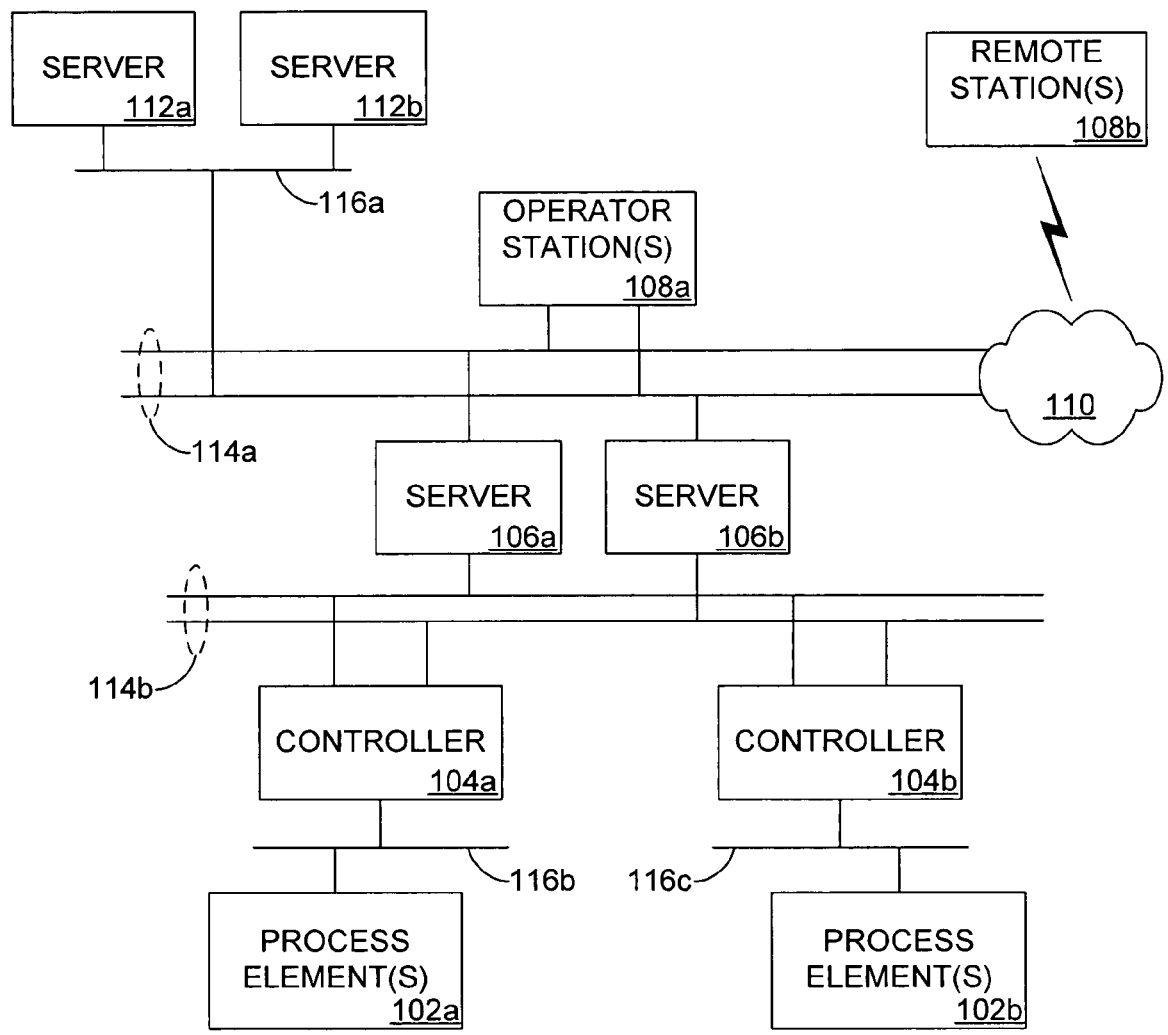
FIG. 1 illustrates an example process control system according to one embodiment of this disclosure.

FIG. 1 illustrates an example process control system 100 according to one embodiment of this disclosure. The embodiment of the process control system 100 shown in FIG. 1 is for illustration only. Other embodiments of the process control system 100 may be used without departing from the scope of this disclosure.

In this example embodiment, the process control system 100 includes one or more process elements 102a-102b. The process elements 102a-102b represent components in a process or production system that may perform any of a wide variety of functions. For example, the process elements 102a-102b could represent motors, catalytic crackers, valves, and other industrial equipment in a production environment. The process elements 102a-102b could represent any other or additional components in any suitable process or production system. Each of the process elements 102a-102b includes any hardware, software, firmware, or combination thereof for performing one or more functions in a process or production system.

Two controllers 104a-104b are coupled to the process elements 102a-102b. In this document, the term "couple" and its derivatives refer to any direct or indirect communication between two or more elements, whether or not those elements are in physical contact with one another. The controllers 104a-104b control the operation of the process elements 102a-102b. For example, the controllers 104a-104b could be capable of providing control signals to the process elements 102a-102b periodically. As a particular example, if a process element represents a motor, one of the controllers 104a-104b could provide control information to the motor once every millisecond. Each of the controllers 104a-104b includes any hardware, software, firmware, or combination thereof for controlling one or more of the process elements 102a-102b. The controllers 104a-104b could, for example, represent C300 controllers.

Two servers 106a-106b are coupled to the controllers 104a-104b. The servers 106a-106b perform various functions to support the operation and control of the controllers 104a-104b and the process elements 102a-102b. For example, the servers 106a-106b could log information collected or generated by the controllers 104a-104b, such as status information related to the operation of the process elements 102a-102b. The servers 106a-106b could also execute applications that control the operation of the controllers 104a-104b, thereby controlling the operation of the process elements 102a-102b. In addition, the servers 106a-106b could provide secure access to the controllers 104a-104b. Each of the servers 106a-106b includes any hardware, software, firmware, or combination thereof for providing access to or control of the controllers 104a-104b. The servers 106a-106b could, for example, represent personal computers (such as desktop computers) executing WINDOWS 2000 from MICROSOFT CORPORATION. In this document, the term "application" refers to one or more computer programs, sets of instructions, procedures, functions, objects, classes, instances, or related data adapted for implementation in a suitable computer language.

One or more operator stations 108a-108b are coupled to the servers 106a-106b. The operator stations 108a-108b represent computing or communication devices providing user access to the servers 106a-106b, which could then provide user access to the controllers 104a-104b and the process elements 102a-102b. For example, the operator stations 108a-108b could allow users to review the operational history of the process elements 102a-102b using information collected by the controllers 104a-104b and servers 106a-106b. The operator stations 108a-108b could also allow the users to adjust the operation of the process elements 102a-102b, controllers 104a-104b, or servers 106a-106b. Each of the operator stations 108a-108b includes any hardware, software, firmware, or combination thereof for supporting user access and control of the system 100. The operator stations 108a-108b could, for example, represent personal computers executing WINDOWS 95, WINDOWS 2000, or WINDOWS NT from MICROSOFT CORPORATION.

In this example, at least one of the operator stations 108b is a remote station. The remote station is coupled to the servers 106a-106b through a network 110. The network 110 facilitates communication between various components in the system 100. For example, the network 110 may communicate Internet Protocol (IP) packets, frame relay frames, Asynchronous Transfer Mode (ATM) cells, or other suitable information between network addresses. The network 110 may include one or more local area networks (LANs), metropolitan area networks (MANs), wide area networks (WANs), all or a portion of a global network such as the Internet, or any other communication system or systems at one or more locations.

In this example, the system 100 includes two additional servers 112a-112b. The servers 112a-112b execute various applications to control the overall operation of the system 100. For example, the system 100 could be used in a processing or production plant or other facility, and the servers 112a-112b could execute applications used to control the plant or other facility. As particular examples, the servers 112a-112b could execute applications such as enterprise resource planning (ERP), manufacturing execution system (MES), or any other or additional plant or process control applications. Each of the servers 112a-112b includes any hardware, software, firmware, or combination thereof for controlling the overall operation of the system 100.

As shown in FIG. 1, the system 100 includes various redundant networks 114a-114b and single networks 116a-116c that support communication between components in the system 100. Each of these networks 114a-114b, 116a-116c represents any suitable network or combination of networks facilitating communication between components in the system 100. The networks 114a-114b, 116a-116c could, for example, represent Ethernet networks.

In one aspect of operation, one or more of the controllers 104a-104b, servers 106a-106b, or other components in the system 100 execute one or more applications, such as real-time applications, to control the process elements 102a-102b. For example, the controllers 104a-104b could periodically generate control signals or other signals needed by the process elements 102a-102b to operate correctly.

At least one of the components in the system 100 also executes, supports, or otherwise provides access to an execution environment. The execution environment provides support for various features that managed applications may use during execution. For example, the execution environment could provide support for mathematical functions, input/output functions, and communication functions used by the managed applications. The execution environment could also support compilation of assembly code, management of a heap memory, and any other or additional functions. The phrase "managed application" refers to an application executed in the execution environment, where the execution of the application is managed by the execution environment. Managed applications could include the real-time applications used to control the process elements 102a-102b in the system 100. Managed applications may occasionally be referred to as "managed code," "user code," or "user applications."

The execution environment used in the system 100 to execute the managed applications is deterministic. A deterministic execution environment is an execution environment whose behavior is predictable or that can be precisely specified. Because the execution environment is deterministic in nature, there is a reduced likelihood that real-time managed applications will be unable to maintain their exact time schedules when executed. This also reduces the likelihood that the managed applications will fail. One example embodiment of a deterministic execution environment is shown in FIG. 2, which is described below.

In particular embodiments, the execution environment could be supported in each of the controllers 104a-104b and the servers 106a-106b of the system 100. Also, these components of the system 100 could use processors of the POWERPC processor family running the GREEN HILLS INTEGRITY operating system or processors of the X86 processor family running a MICROSOFT WINDOWS operating system. In addition, the execution environment could be implemented in any suitable manner, such as by using .Net programming based on the CLI specification as ratified by ECMA-335 and support both the Kernel and Compact profiles.

The deterministic execution environment used in the system 100 includes various features. For example, the execution environment supports a deterministic memory manager, which supports the use of a heap memory. The heap memory could represent a memory in one of the controllers 104a-104b or servers 106a-106b, such as a random access memory or other type of memory. The memory manager in the execution environment is deterministic and predictably and automatically manages the heap memory on behalf of the managed applications being executed. As examples, the memory manager could support bounded memory allocation times and a non-intrusive background garbage collection process that executes incrementally using only time slices explicitly given to the garbage collection process. The garbage collection process identifies heap memory that may be reclaimed from a managed application and reused. The memory manager may also support a defragmentation process for the heap memory, in which the memory manager moves blocks of used memory within the heap to combine smaller blocks of unused memory into larger blocks. An example heap memory and example operation of a memory manager are shown in FIGS. 3 through 11, which are described below.

Figure 12:
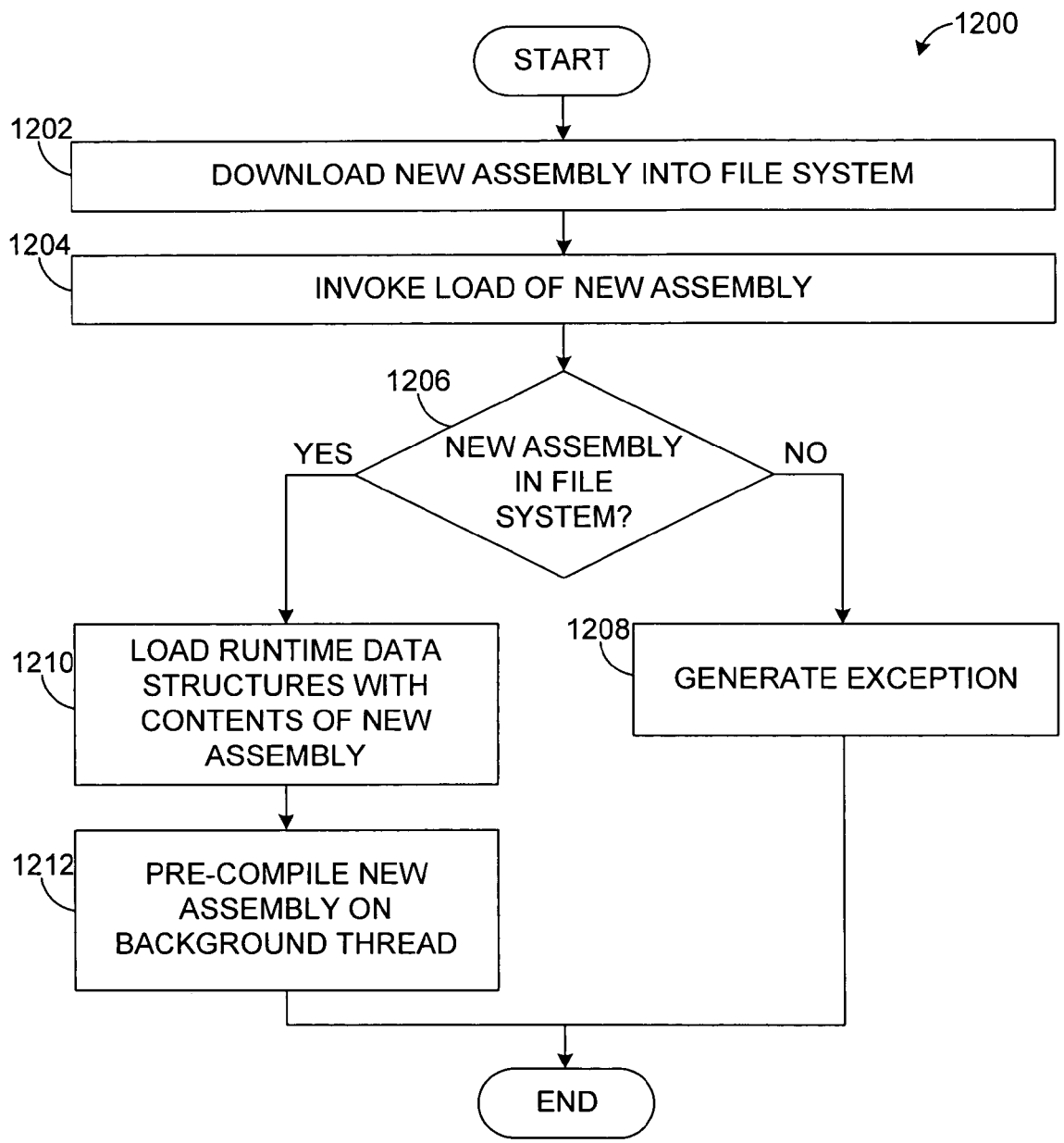
FIG. 12 illustrates an example method for assembly code loading and compilation in an execution environment according to one embodiment of this disclosure.
Figure 13:
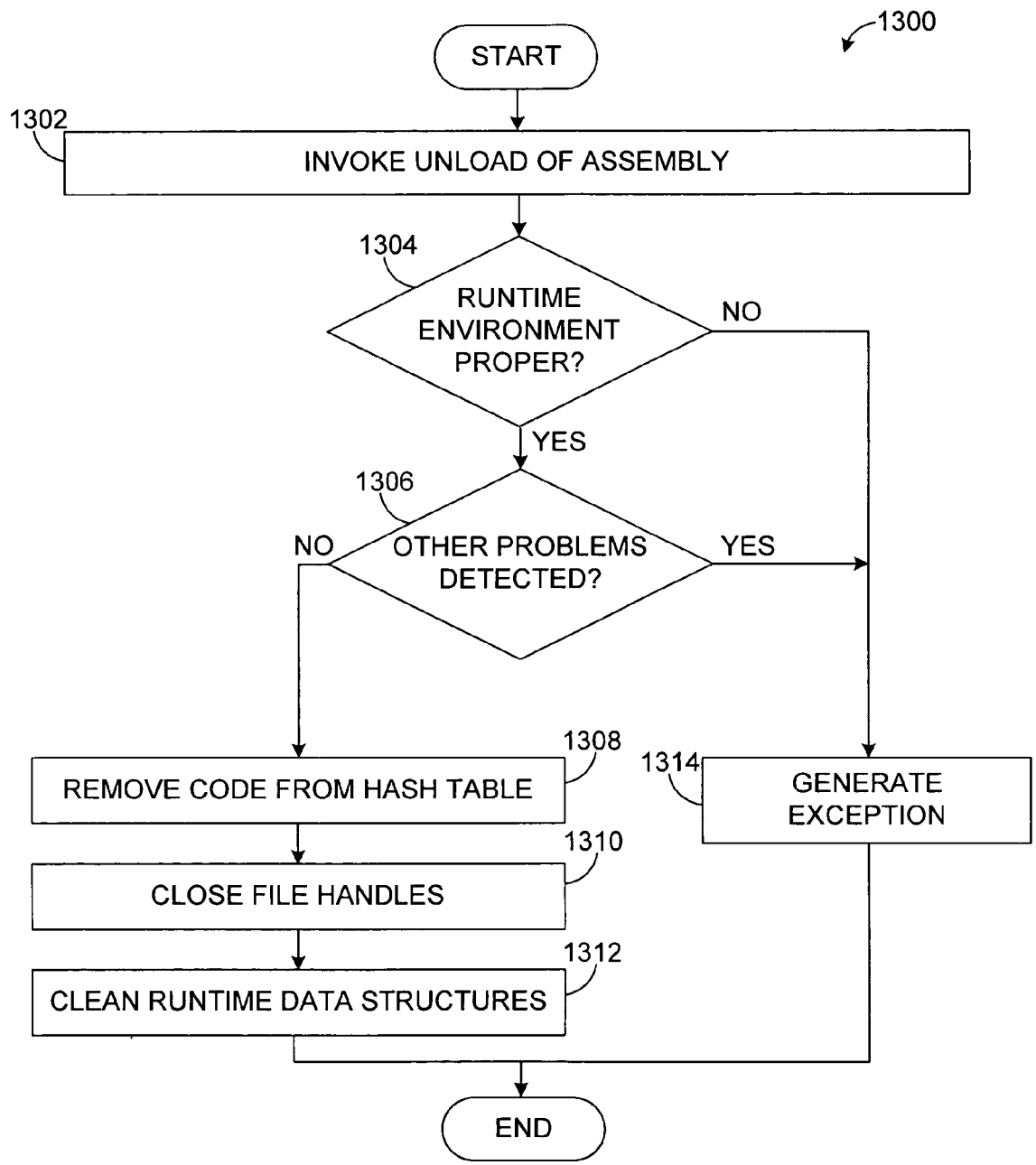
FIG. 13 illustrates an example method for assembly code unloading in an execution environment according to one embodiment of this disclosure.
Figure 14:
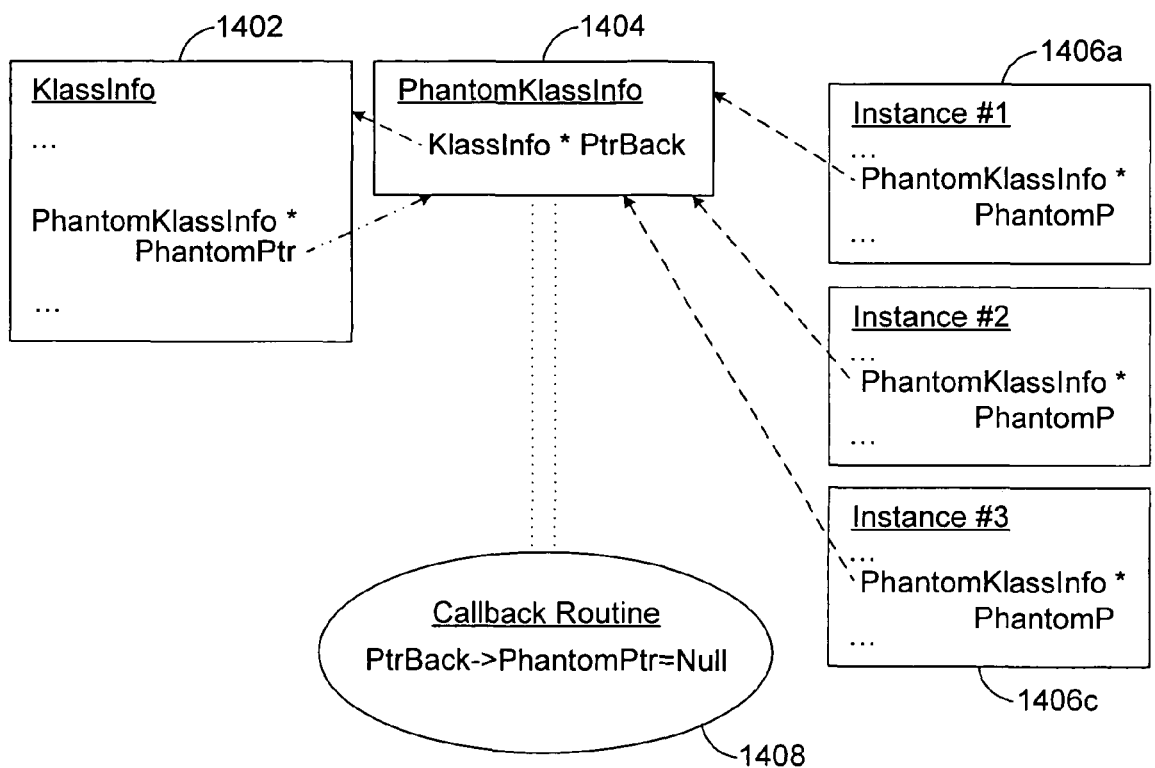
FIG. 14 illustrates an example mechanism for tracking assembly code usage in an execution environment according to one embodiment of this disclosure.

The deterministic execution environment also supports load-time compilation of assembly code, which is also known as ahead-of-time compilation. Just-in-time compilation of code is performed when execution of the code is requested for the first time. This has an inherent variable execution time since it may take longer to perform the compilation in response to the first request to execute a program (as opposed to subsequent requests). Load-time compilation of assembly code helps to avoid this non-deterministic behavior by pre-compiling assembly code when the code is loaded, rather than waiting for the first request to execute the code. An assembly code load process and an assembly code unload process are used in the execution environment to load assembly code for compilation and to unload compiled code in the system 100. Example loading, compilation, unloading, and management of assembly code are shown in FIGS. 12 through 14, which are described below.

Figure 15:
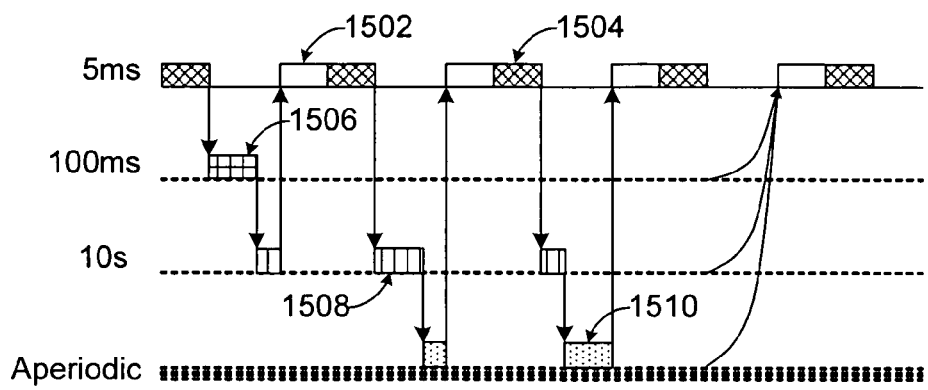
FIG. 15 illustrates an example timing of program execution in an execution environment according to one embodiment of this disclosure.

Beyond that, a scheduler in the execution environment ensures that processing resources are shared between the managed applications being executed and housekeeping tasks. The phrase "housekeeping tasks" refers generally to the various processes performed in the execution environment that are needed to ensure proper execution of the managed applications or proper operation of the execution environment. Housekeeping tasks may include heap memory management (such as garbage collection and defragmentation), loading and unloading of assembly code, and compilation of assembly code. In some embodiments, the managed applications and the housekeeping tasks are executed as schedulable threads in various time slices. The housekeeping task threads may be preempted when needed in order to ensure that the managed application threads satisfy their time schedules. Moreover, the housekeeping tasks are designed to operate incrementally, allowing the housekeeping tasks to perform meaningful units of work in the time slices allocated to the housekeeping tasks. In other words, the housekeeping tasks can perform useful operations before being preempted by the managed applications, at which point the managed applications could overwrite data used by or otherwise interfere with the operation of the housekeeping tasks. An example operation of a scheduler is shown in FIG. 15, which is described below.

In addition, class libraries that may be used by the managed applications are examined or audited. Functions or libraries are examined to determine if the functions or libraries are bounded in terms of resource utilization and execution time. Managed applications are then prevented from using functions or libraries that are unbounded in terms of resource utilization or execution time since these functions or libraries are non-deterministic. As an example, a function may support communication with an external component over a network. If the external component is a non-deterministic component or the network is unreliable, the execution time of the function may be unknown. The function is therefore non-deterministic, and managed applications are blocked from using that function in the execution environment. The audit could be performed manually or automatically based on any suitable criteria.

By providing these various features and limits in the execution environment, the execution environment is more deterministic and therefore more suitable for use with real-time and other managed applications. The housekeeping tasks needed to maintain the execution environment do not interfere with the execution of the managed applications, which may allow the managed applications to meet any necessary time schedules or otherwise operate effectively.

Although FIG. 1 illustrates one example of a process control system 100, various changes may be made to FIG. 1. For example, a control system could include any number of process elements, controllers, servers, and operator stations. Also, FIG. 1 illustrates one operational environment in which the execution environment described above could be used. The execution environment could be used in any other suitable device or system.

FIG. 2 illustrates an example execution environment 200 according to one embodiment of this disclosure. The embodiment of the execution environment 200 shown in FIG. 2 is for illustration only. Other embodiments of the execution environment could be used without departing from the scope of this disclosure. The execution environment 200 shown in FIG. 2 could be implemented in the controllers 104a-104b or servers 106a-106b of FIG. 1, although the execution environment 200 could be used in any other suitable device or system.

In this example embodiment, the execution environment 200 includes a global assembly cache (GAC) 202. The global assembly cache 202 represents a memory capable of storing different assembly code programs to be executed in the execution environment 200. The assembly code programs could represent the managed applications to be executed in the execution environment 200. As an example, the global assembly cache 202 could store an assembly code program capable of controlling one or more of the process elements 102a-102b of FIG. 1. The global assembly cache 202 could store multiple assembly code programs and/or different versions of the same assembly code program. The global assembly cache 202 represents any suitable storage and retrieval device or devices.

An assembly loader 204 loads assembly code into the execution environment 200 for execution. For example, the assembly loader 204 may retrieve new assembly code downloaded by a user into the global assembly cache 202. The assembly loader 204 may then load the identified assembly code into a compiler for compilation and use in the execution environment 200. The assembly loader 204 includes any hardware, software, firmware, or combination thereof for loading assembly code for compilation. The assembly loader 204 could, for example, represent a software thread executed in the background of the execution environment 200.

An ahead-of-time (AOT) compiler 206 compiles the assembly code loaded by the assembly loader 204. The AOT compiler 206 represents a load-time compiler that compiles assembly code when the assembly code is loaded. For example, the AOT compiler 206 may convert assembly code from an intermediate language to native executable code capable of being executed in the execution environment 200. Also, the AOT compiler 206 could insert instructions into the native executable code to ensure proper execution of the code in the execution environment 200. The AOT compiler 206 includes any hardware, software, firmware, or combination thereof for compiling assembly code. The AOT compiler 206 could, for example, represent a software thread executed in the background of the execution environment 200.

The AOT compiler 206 produces native executable code, such as native executable codes 208a-208b. The native executable codes 208a-208b represent executable code capable of being executed in the execution environment 200. The native executable codes 208a-208b could provide any suitable functionality in the execution environment 200, such as providing control of one or more process elements 102a-102b of FIG. 1. The native executable codes 208a-208b could provide any other or additional functionality in the execution environment 200.

One or more application domains 210 represent the domains in which one or more managed applications (such as the applications implemented by the native executable codes 208a-208b) are executed in the execution domain 200. Each application domain 210 represents any suitable domain for executing one or more managed applications. While shown as a single application domain 210 in FIG. 2, multiple application domains 210 could be used.

The assembly codes and native executable codes in the execution environment 200 are managed by a code manager 212. For example, the code manager 212 may control the loading and unloading of assembly code in the execution environment 200. As a particular example, the code manager 212 could receive a command from a user or managed application instructing the execution environment 200 to load an assembly code program. The code manager 212 could then cause the assembly loader 204 to load the assembly code into the AOT compiler 206, and the AOT compiler 206 generates native executable code that is loaded into the application domain 210. The code manager 212 could also receive a command from a user or managed application instructing the execution environment 200 to unload an assembly code program. The code manager 212 could then unload the native executable code associated with the identified assembly code from the application domain 210. The process of unloading an assembly code may include reclaiming the memory associated with that assembly code and ensuring that associations between the assembly code being unloaded and the execution environment 200 or other programs are removed. The code manager 212 includes any hardware, software, firmware, or combination thereof for managing assembly code and/or compiled code used in the execution environment 200. The code manager 212 could, for example, represent a software thread executed in the background of the execution environment 200.

The execution environment 200 also includes a memory manager 214. The memory manager 214 represents a deterministic memory manager that manages the use of a heap memory. For example, the memory manager 214 could allocate blocks of heap memory to managed applications being executed in the application domain 210. The memory manager 214 could also use garbage collection information 216 to release blocks of heap memory that are no longer being used by the managed applications. The garbage collection information 216 could, for example, be generated by a garbage collection process provided by the memory manager 214 and executed in the background of the execution environment 200. In addition, the memory manager 214 could support a defragmentation process for the heap memory. The defragmentation process could be used to combine unused blocks of heap memory into larger blocks. The memory manager 214 includes any hardware, software, firmware, or combination thereof for managing a heap memory. The memory manager 214 could, for example, represent a software thread executed in the background of the execution environment 200.

In addition, the execution environment 200 includes an exception table 218, which stores exception information 220. The exception information 220 identifies various problems experienced in the execution environment 200. Example problems could include attempting to load assembly code that does not exist in an explicitly specified location or in the global assembly cache 202, an error during compilation of loaded assembly code, or attempting to unload assembly code not previously loaded. An application or process being executed in the execution environment 200 could generate an exception identifying a detected problem. The exception is identified by the exception information 220, which is stored in the exception table 218 for later use (such as during debugging) or for use by the application or process for automatic recovery at runtime.

A scheduler 222 is used to schedule execution of the managed applications. The scheduler 222 may also be used to schedule execution of the housekeeping tasks in the execution environment 200. The housekeeping tasks include, among other things, heap memory management, assembly loading and unloading, assembly compilation, management of asynchronous and event driven methods such as timers and callbacks, checkpointing and serialization of data (used to store data in a persistent memory such as a battery backup RAM) to support the use of redundant controllers and warm restarts, and miscellaneous tasks such as metrics collection. For example, the scheduler 222 could support time slicing to allow multiple threads to be executed, where the threads represent the housekeeping tasks and the managed applications. The scheduler 222 includes any hardware, software, firmware, or combination thereof for scheduling the execution of applications and other tasks.

In some embodiments, the scheduler 222 and the execution environment 200 cooperate and collaborate to ensure that the managed applications and the housekeeping tasks are executed properly. For example, the scheduler 222 may control when and for how long the housekeeping tasks may be executed in the execution environment 200. As a particular example, the scheduler 222 could preempt all threads executing the managed applications and then call the execution environment 200 to execute one or more housekeeping tasks. The scheduler 222 informs the execution environment 200 of the amount of time available to perform the housekeeping tasks. The execution environment 200 guarantees that control is returned to the scheduler 222 on or before the expiration of that amount of time. While the execution environment 200 is performing a housekeeping task, managed applications that read or write data to a heap memory may not interrupt the housekeeping task. Other threads that do not access a heap memory (such as an interrupt service routine or ISR) could be allowed to interrupt a housekeeping task. Averaged over time, the scheduler 222 may provide the execution environment 200 with enough time to perform the housekeeping tasks needed for the managed applications to execute properly. As an example, the managed applications may use up to approximately 80% of the time slices available, while the remaining 20% are used by the housekeeping tasks.

This type of scheduling may impose certain requirements on the managed applications. For example, the managed applications should, over time, allow adequate processing resources to be provided to and used by the housekeeping tasks. Also, a managed application should either come to a "clean point" or use read and write barriers before transferring control to the housekeeping tasks. A "clean point" generally represents a point where a sequence of related instructions being executed for the managed application has been completed, rather than a point that occurs during execution of the sequence of related instructions. As an example, a managed application should complete accessing data in a data structure or file when the transfer of control occurs, rather than being in the middle of reading data or writing data. A read or write barrier is used when the managed application is not at a clean point when the transfer of control occurs. The read or write barrier generally represents a marker or flag used to inform the housekeeping tasks that particular data is currently being used by a managed application. This may prevent the housekeeping tasks from moving the data during defragmentation or discarding the data during garbage collection.

In some embodiments, the various components shown in FIG. 2 operate over a platform/operating system abstraction layer. The platform/operating system abstraction layer logically separates the execution environment 200 from the underlying hardware platform or operating system. In this way, the execution environment 200 may be used with different hardware platforms and operating systems without requiring the execution environment 200 to be specifically designed for a particular hardware platform or operating system.

Although FIG. 2 illustrates one example of an execution environment 200, various changes may be made to FIG. 2. For example, the functional division shown in FIG. 2 is for illustration only. Various components in FIG. 2 could be combined or omitted and additional components could be added according to particular needs.

FIGS. 3 through 11 illustrate an example heap memory and example operations of a memory manager (such as memory manager 214) to manage the heap memory in a deterministic execution environment. For ease of explanation, FIGS. 3 through 11 are discussed with respect to the memory manager 214 of FIG. 2.

As noted above, the memory manager 214 may support various functions to facilitate the use of a heap memory. For example, memory manager 214 could support bounded allocation of heap memory within a predeterminable maximum time. Also, the memory manager 214 could support an incremental and interoperable garbage collection process to reclaim allocated blocks of heap memory. In addition, the memory manager 214 could support an incremental defragmentation process to consolidate smaller unused blocks of heap memory into larger blocks.

FIG. 3 illustrates an example heap memory 300 according to one embodiment of this disclosure. In particular, FIG. 3 illustrates one instance of a heap memory. As described below, multiple instances of the heap memory 300 could be used in an execution environment 200.

As shown in FIG. 3, the heap memory 300 includes a management area 302 and a heap area 304. The management area 302 stores information used to manage the heap memory 300. For example, the management area 302 may include information identifying used and unused blocks of memory in the heap area 304. The heap area 304 stores information used by managed applications and housekeeping tasks executed in the execution environment 200. In some embodiments, the management area 302 and the heap area 304 are located adjacent to one another. In particular embodiments, both of the areas 302-304 are provided in response to a single request when a heap is created.

The heap area 304 typically includes used blocks of memory and unused or "free" blocks of memory. Used blocks of memory are allocated to one or more managed applications for use during execution. Free blocks of memory are not allocated to any applications and are available to be allocated by the memory manager 214. In some embodiments, each block of memory in the heap area 304 includes a value identifying the size of the block at the beginning and the end of the block. For example, a free block may have its size denoted with a positive value in both the first and last positions of the block. A used block may have its size denoted with a negative value in both the first and last positions of the block.

In some embodiments, a used block of memory in the heap area 304 has one of two forms. A relocatable used block represents a block of memory that could be moved during defragmentation of the heap area 304. A non-relocatable used block represents a block of memory that cannot be moved during defragmentation and that is fixed in the heap area 304. Relocatable blocks are addressed indirectly, and non-relocatable blocks are addressed directly. Relocatable and non-relocatable blocks could be allocated using different function calls (such as GetMemoryFloating( ) and GetMemoryFixed( ), respectively).

In some embodiments, the memory manager 214 could provide simultaneous and independent management of multiple heap memories 300. For example, each new instance of a heap memory 300 may be created using a function call (such as InitializeHeap( )). Each independent heap memory 300 may have its own associated garbage collection and defragmentation processes, and each may operate independently from the others. Also, one instance of a heap memory 300 could be used by one or multiple threads in the execution environment 200. A heap memory 300 could be designated as requiring or not requiring multi-threading support. As an example, multi-threading support may not be needed if a heap memory 300 is used by a single thread or if simultaneous heap requests from multiple threads do not occur. Otherwise, if multi-threading support is needed, it could be provided, for example, using mutually exclusive (MUTEX) structures provided by an underlying operating system.

Each instance of a heap memory 300 may have a unique "instance identifier," which may be provided when the heap memory 300 is created. The instance identifier for a heap memory 300 may be used in later function calls affecting that heap memory 300. For example, application programming interfaces (APIs) may be provided to allow managed applications to create, access, and use a heap memory 300, such as APIs used to allocate memory blocks from a heap memory 300. In particular embodiments, the APIs may or may not require an instance identifier, although providing the instance identified for a heap memory 300 may provide enhanced performance. If a heap identifier is not provided in an API function call but a heap identifier is needed to perform a requested function, the memory manager 214 could use a memory address in the API function call to identify a heap instance, or the memory manager 214 could use the heap identifier of the most recently created heap instance. Appendix A contains a description of example APIs that may be supported by the memory manager 214.

FIG. 4 illustrates an example use of a heap memory block in a heap memory according to one embodiment of this disclosure. In particular, FIG. 4 illustrates how a heap memory block 402 in a heap memory (such as heap memory 300) could be allocated and used in an execution environment 200.

As shown in FIG. 4, an indirect addressing scheme may be used with the heap memory block 402. In this indirect addressing scheme, a connector 404 is used to link a pointer 406 with an actual block 402 in the heap memory 300. The pointer 406 may represent a pointer used by a managed application. From the perspective of the managed application, the pointer 406 allows the managed application to access the heap block 402. However, the pointer 406 itself points to the connector 404, and the connector 404 then directs the pointer 406 to a specific block 402 in the heap memory 300. In a direct addressing scheme, the pointer 406 would point directly to the heap block 402, without any intervening connector 404.

In some embodiments, multiple connectors 404 are used to facilitate relocation of multiple heap blocks 402 during defragmentation. For example, when a managed application invokes a GetMemoryFloating( ) API function call, the application receives a pointer 406 to a connector 404, which points to the actual allocated heap block 402. If the heap block 402 is later moved during defragmentation, the connector 404 pointing to that heap block 402 is adjusted to point to the new location of the heap block 402. The managed application itself may contain any number of references to the connector 404, but only the connector 404 itself needs to be adjusted when the heap block 402 is moved during defragmentation.

The heap block 402 shown in FIG. 4 may represent any suitable amount of space in a heap memory 300. Also, the heap block 402 may include any suitable contents, including size values placed at the beginning and end of the block 402. In addition, the connector 404 may represent any suitable pointer or other mechanism to identify a heap block 402.

Figure 5:
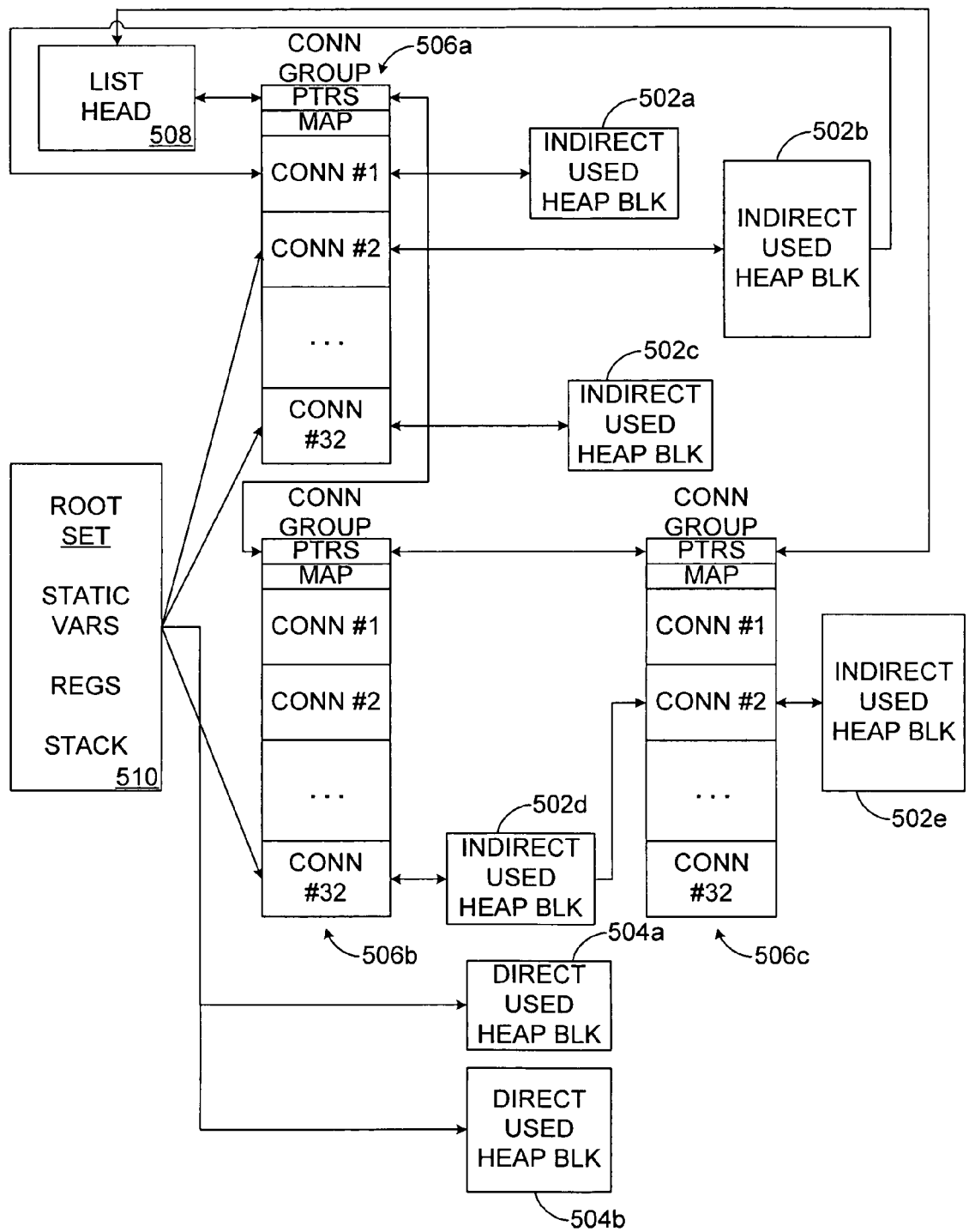
FIG. 5 illustrates additional details of an example use of a heap memory according to one embodiment of this disclosure.

FIG. 5 illustrates additional details of an example use of a heap memory according to one embodiment of this disclosure. In particular, FIG. 5 illustrates how both indirect addressing and direct addressing may be used to identify used heap blocks in the heap memory 300.

As shown in FIG. 5, the heap memory includes both indirect used blocks 502a-502e and direct used blocks 504a-504b. The indirect used blocks 502a-502e represent blocks indirectly addressed in the execution environment 200 (as with block 402 in FIG. 4). Direct used blocks 504a-504b represent blocks directly addressed in the execution environment 200. For example, the indirect used blocks 502a-502e could be identified by the connectors 404 shown in FIG. 4, and direct used blocks 504a-504b could be identified without the use of connectors. In some embodiments, the indirect used blocks 502a-502e may be relocated during defragmentation, while the direct used blocks 504a-504b are not. The indirect used blocks 502a-502e and the direct used blocks 504a-504b could be allocated using the GetMemoryFloating( ) and GetMemoryFixed( ) API function calls, respectively.

The connectors (such as connectors 404) used with the indirect used blocks 502a-502e are stored within connector groups 506a-506c. In this example, each of the groups 506a-506c contains space for 32 connectors, and each of the connectors may or may not be in use (pointing to an allocated heap block). Each of the groups 506a-506c also includes a map (such as a long word bitmap) identifying which connectors in that group are in use. In addition, each of the groups 506a-506c includes one or more pointers (PTRS), which may be used to point to prior and subsequent groups (if a prior or subsequent group exists). The groups 506a-506c are anchored by a group list head 508, which points to the first group 506a. In some embodiments, the group list head 508 is located in the management area 302 of a heap memory 300.

The connector groups 506a-506c may be allocated from the heap area 304 of the heap memory 300 as needed in order to provide indirect used blocks 502a-502e for one or more managed applications. The groups 506a-506c are bidirectionally chained together to facilitate tracking and deallocation. In particular embodiments, each of the groups 506a-506c should have at least one connector in use, or a group is deallocated if all of its connectors are unused. Also, the groups 506a-506c need not be visible to the managed applications.

As shown in FIG. 5, the direct used blocks 504a-504b and the connectors in the groups 506a-506c are referenced by a root set 510. The root set 510 includes registers, stacks, static memories, or other memory structures capable of storing pointers (such as the pointer 406 of FIG. 4) to blocks in the heap memory 300. Moreover, one indirect used block could point to another indirect used block through a connector. As an example, the indirect used block 502d points to the indirect used block 502e through the second connector in the group 506c.

In some embodiments, the groups 506a-506c may be allocated from the heap memory 300 as normal used blocks. Also, the groups 506a-506c are not relocated during defragmentation. This may be indicated in any suitable manner, such as by providing a flag (such as a HEAP_MANAGER bit) in a header of each block storing one or more of the groups 506a-506c. In addition, to help hide this unique memory referencing scheme from the managed applications, the compilation performed by the AOT compiler 206 may implement this referencing scheme automatically and invisibly.

In particular embodiments, a new connector group may be allocated from the general heap memory 300 when a connector is needed and space in the existing groups 506a-506c is unavailable. These connector groups may have a long or even permanent lifetime, which might impact the defragmentation of the heap memory 300. A specified number of special connector groups may be pre-allocated during initialization of the heap memory 300. These pre-allocated connector groups may be allocated contiguously from the bottom of the new heap memory 300, and they may not be freed to the general pool of free space even when they contain no used connectors. During operation, if a connector is needed and no connectors in the pre-allocated groups are free, a connector group may be allocated from the general heap area 304 and later freed if it becomes possible to do so. By pre-allocating a reasonable number of special connector groups during heap initialization, many or all of the connector groups can be kept out of the middle of the heap memory 300. This may help to improving the overall defragmentation of the heap memory 300.

While FIG. 5 illustrates the use of indirect used heap blocks and direct used heap blocks, additional kinds of blocks could be used or supported in the heap memory 300. For example, transient used blocks could be created and used during the garbage collection process. Among other things, these blocks could store a list of recursively discovered references to the heap memory 300 whose memory locations have not yet been examined. At the end of the garbage collection process, these blocks may be deallocated. The garbage collection process is described in more detail below.

Figure 6:
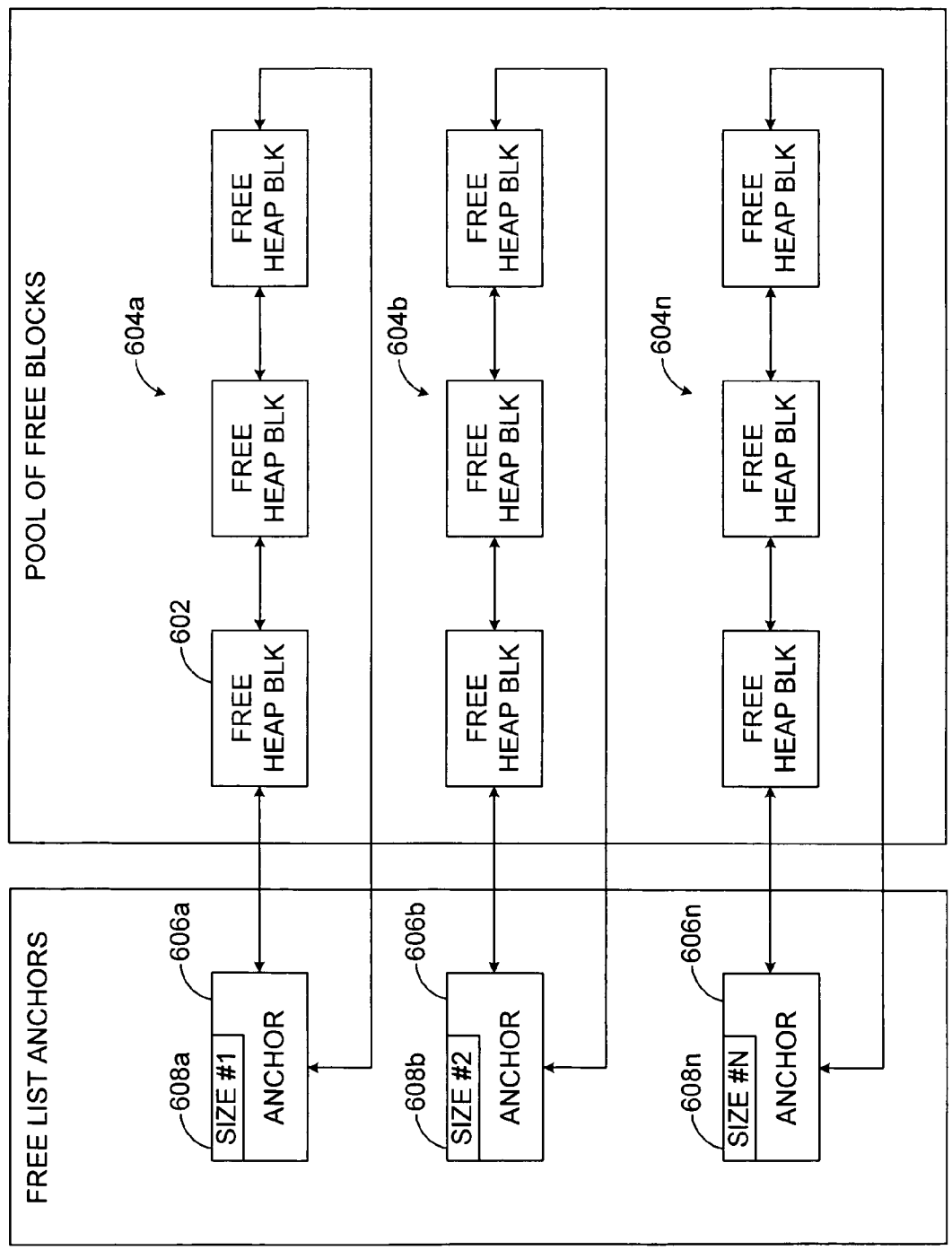
FIG. 6 illustrates an example arrangement for identifying free space in a heap memory according to one embodiment of this disclosure.

FIG. 6 illustrates an example arrangement for identifying free space in a heap memory according to one embodiment of this disclosure. In particular, FIG. 6 illustrates how free blocks in the heap memory 300 may be chained together on size-sorted lists, which may allow for the fast and deterministic location of a free block having a suitable size.

As shown in FIG. 6, the heap memory 300 includes various free blocks 602 that are arranged into multiple chains 604a-604n. Each of the free blocks 602 could represent any suitable amount of contiguous unused space in the heap memory 300. Each of the chains 604a-604n could include any number of free blocks 602 (including zero free blocks). The chains 604a-604n are anchored by multiple anchors 606a-606n. The anchors 606a-606n represent pointers that point to the first free block 602 and the last free block 602 in the chains 604a-604n. In some embodiments, the anchors 606a-606n are stored in the management area 302 of the heap memory 300, and the free blocks 602 reside in the heap area 304 of the heap memory 300.

In some embodiments, the anchors 606a-606n are associated with size indicators 608a-608n, respectively. Also, the anchors 606a-606n may be sorted based on the size indicators 608a-608n. Each of the size indicators 608a-608n identifies the smallest free block 602 in one of the chains 604a-604n. In other words, the free blocks 602 in a chain are all at least as big as the size indicator for that chain. Moreover, the free blocks 602 in one chain are all smaller than the size indicator for the next higher chain. In addition, the free blocks 602 within a chain could be sorted or semi-sorted in order of increasing block size.

To allocate a free block 602 to a managed application, a scan is performed to identify an anchor having a size indicator that equals or is greater than the amount of memory needed by the application. In some embodiments, a rapid and efficient binary search may be used so that the search time is deterministic. When a suitable anchor is identified, a check is performed to determine if the anchor is associated with a chain having any free blocks. If the chain associated with the identified anchor is empty, the search continues for another suitable anchor. Otherwise, the chain associated with the identified anchor is not empty, and a free block 602 in that chain is allocated to the managed application. In particular embodiments, two modes of allocation are supported, one for absolute determinism and another for "best effort" (which is almost deterministic and may be a better choice for some applications). Example code used to support these modes of allocation is shown in Appendix B.

Turning to FIGS. 7 through 11, as noted above, the memory manager 214 is responsible for managing the heap memory 300 and providing access to the heap memory 300. Also, the memory manager 214 could support one or more APIs to allow external elements (such as the managed applications) to invoke functions of the memory manager 214 (such as an allocation of memory). The following represents several examples of functions performed by the memory manager 214. The memory manager 214 could support any other or additional functionality and APIs or other interfaces without departing from the scope of this disclosure.

Figure 7:
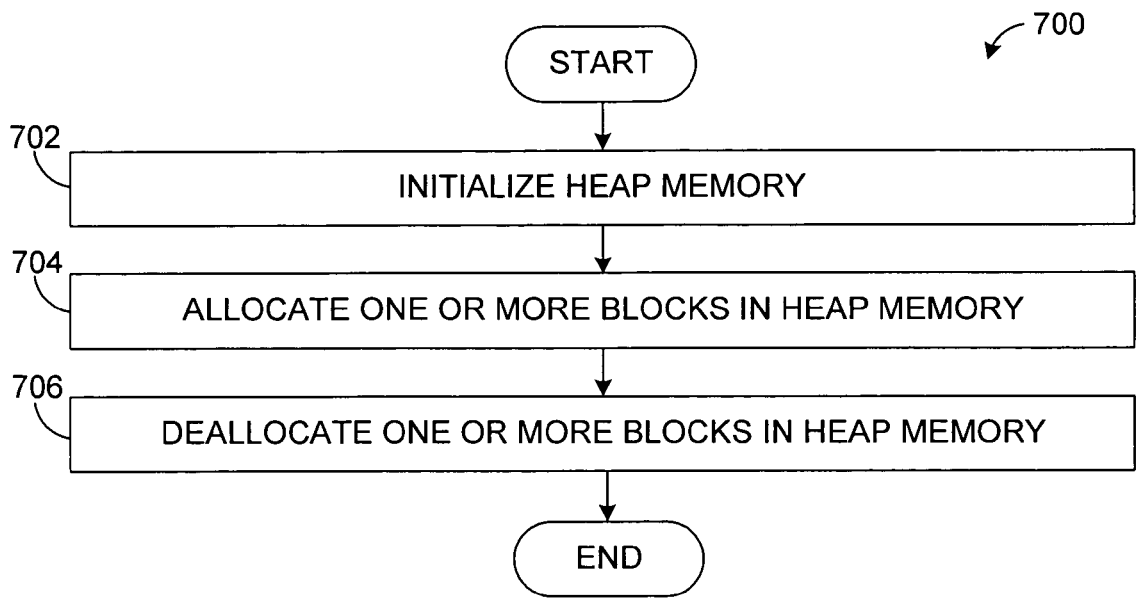
FIG. 7 illustrates an example method for managing a heap memory in an execution environment according to one embodiment of this disclosure.

FIG. 7 illustrates an example method 700 for managing a heap memory in an execution environment according to one embodiment of this disclosure. For ease of explanation, the method 700 is described with respect to the memory manager 214 of FIG. 2 managing the heap memory 300 shown in FIG. 3 (which operates as shown in FIGS. 4 through 6). The method 700 could be used in any other suitable execution environment to manage any other suitable heap memory.

The memory manager 214 initializes a heap memory 300 at step 702. For example, the memory manager 214 may first initialize a management area 302. After that, a malloc command is executed to obtain an amount of memory requested by a managed application. The obtained memory represents the heap area 304 of the new heap. In some embodiments, the heap area 304 is somewhat larger than the amount of memory requested by the managed application. In these embodiments, additional memory is requested to provide buffering both before and after the actual heap. Information about where the heap area 304 is located may be stored in the management area 302. If the managed application requests that one or more connector groups be pre-allocated, the memory manager 214 may create the connector groups in the new heap area 304.

The memory manager 214 allocates one or more blocks in the new heap memory 300 at step 704. To allocate blocks within an initialized heap to an application, the anchors 606a-606n and associated chains 604a-604n are scanned to identify the first chain containing a free block 602 that could satisfy the managed application's requirements (such as the requested block size). Optionally, additional free blocks 602 in the same chain could be examined to determine if they more accurately meet the application's requirements (such as more closely matching the requested block size). This could provide statistically better performance while retaining the deterministic character of the memory manager 214. For example, three additional free blocks 602 could be examined to determine if any of those free blocks 602 more closely match the block size needed by the application. One of the located free blocks 602 is then allocated for use by the application. In particular embodiments, a balanced binary tree is used to enable a fast search of the anchors 606a-606n.

When allocating a free block 602 to a managed application, extra memory beyond the application's needs could be allocated. For example, the free block anchors 606a-606n may be scanned to locate a free block 602 as described above. The selected free block 602 could match the application's needs perfectly (the requested size matches the actual block size), could be slightly too large, or could be much too large. If the free block 602 is a perfect fit, the entire free block 602 is allocated to the application. If the free block 602 is much too large, the free block 602 is split into one used block that is allocated to the application and one free block that is placed in the appropriate chain (such as one of the chains 604a-604n).

If the free block 602 is slightly too large, a determination is made as to whether the free block 602 is split or completely allocated to the application. For example, a determination could be made as to whether the free block 602 exceeds the application's requested size by more than a specified amount (such as ten long words). If so, the free block 602 is split as described above. Otherwise, the entire free block 602 is allocated to the application, and the actual size of the block and the amount of over-allocation are stored in the block 602. By storing the amount of over-allocation in the block, the extra allocated space may be reclaimed later during defragmentation.

Eventually, the blocks allocated to a managed application may be deallocated. This could occur in response to an express deallocation request from the application, in response to the garbage collection process, or in response to any other suitable event. The memory manager 214 deallocates one or more blocks in the heap memory 300 at step 706. To deallocate used blocks within an initialized heap, the memory manager 214 receives information identifying a used block. If the memory manager 214 maintains statistics about usage of the heap memory 300, the memory manager 214 could update the statistics. The memory manager 214 also releases any connector 404 pointing to the used block being deallocated. In addition, the memory manager 214 coalesces the used block being deallocated with any adjacent free block(s). In general, coalescing is a process where adjacent free blocks are merged into a single, larger free block. The memory manager 214 could examine the blocks adjacent to the used block being deallocated. If all neighboring blocks are used, the block being deallocated is freed and placed into the appropriate chain (one of the chains 604a-604n). If one or more neighboring blocks are free, each free neighboring block is removed from its chain, the blocks are combined into a single block, and the combined block is placed in the appropriate chain.

Figure 8:
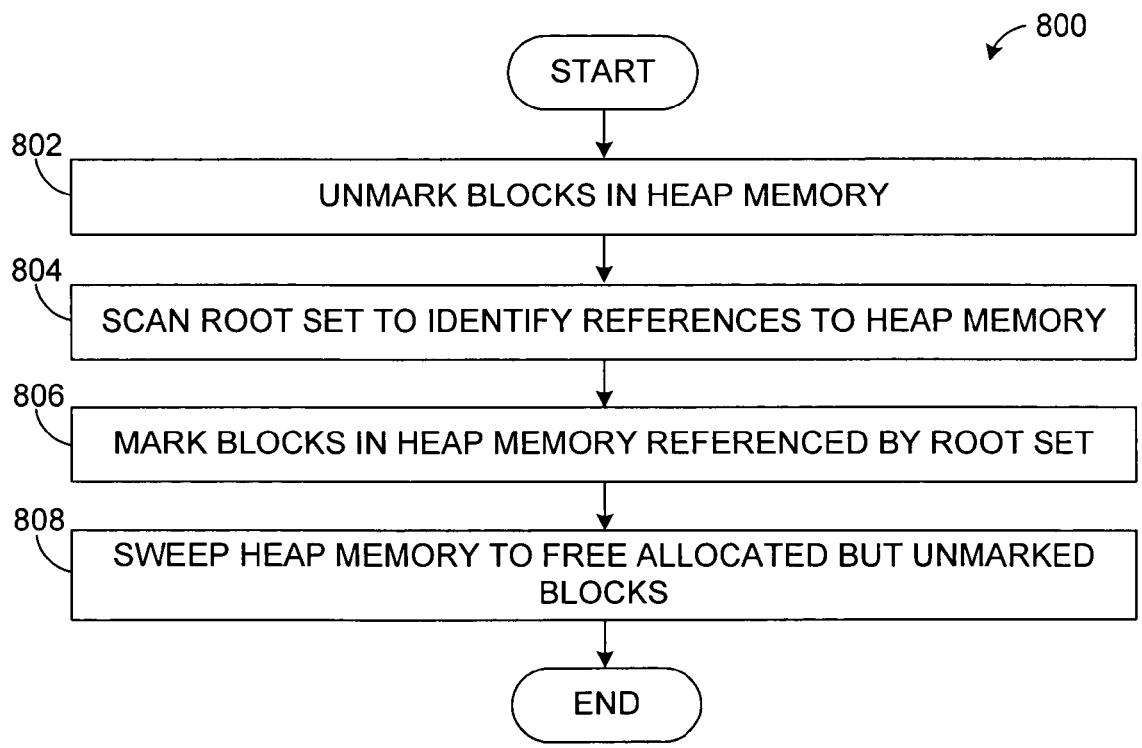
FIG. 8 illustrates an example method for garbage collection in an execution environment according to one embodiment of this disclosure.

FIG. 8 illustrates an example method 800 for garbage collection in an execution environment according to one embodiment of this disclosure. For ease of explanation, the method 800 is described with respect to the memory manager 214 of FIG. 2 managing the heap memory 300 shown in FIG. 3 (which operates as shown in FIGS. 4 through 6). The method 800 could be used in any other suitable execution environment to manage any other suitable heap memory.

The garbage collection process implemented by the memory manager 214 is responsible for locating allocated blocks of heap memory that are no longer being used by the applications that requested them. In some embodiments, the memory manager 214 uses a "mark/sweep" garbage collection process. In this process, the memory manager 214 unmarks or "clears" some or all of the blocks in a heap memory 300 at step 802. Each block in the heap memory 300 may include a header where various bits or flags may be set. The memory manager 214 could set the appropriate bit or flag in each block to an "unmarked" value. Some blocks (such as connector groups 506a-506c) are automatically marked as being in use, and these block need not be unmarked by the memory manager 214.

The memory manager 214 then scans the root set 510 for references to the heap memory 300 at step 804. The root set 510 could include registers, stacks, and static memory used by applications in the execution environment 200. The root set 510 is examined to locate any pointers that may point to an in-use heap block. Those pointers may point directly to heap blocks (direct used heap blocks 504a-504b) or indirectly to heap blocks (indirect used heap blocks 502a-502e).

The memory manager 214 follows the pointers and marks the direct and indirect used heap blocks at step 806. For example, the memory manager 214 may set the bit or flag in each direct and indirect used heap block to indicate that the block is currently in use. As shown in FIG. 5, locating indirect used heap blocks may involve following a pointer to one connector, which points to one indirect used heap block. That indirect used heap block may itself point to another connector, which points to another indirect used heap block.

The memory manager 214 then sweeps through the heap memory 300 to free all allocated and unmarked blocks at step 808. The allocated and unmarked blocks represent used blocks that have been allocated, but the blocks no longer appear to be used by the applications that requested them. These blocks are then freed using, for example, the deallocation technique described above with respect to step 706 in FIG. 7. Again, special blocks (such as the connector groups 506a-506c) may be automatically marked as being in-use and are not swept. In this document, each full execution of the mark/sweep algorithm may be referred to as a "garbage collection cycle."

To make the garbage collection process deterministic, the garbage collection process is implemented as an incremental, interruptible, and interoperable process. For example, the garbage collection process may be executed in incremental steps, allowing the garbage collection process to operate in time slices not used by the managed applications being executed in the execution environment 200. Also, the garbage collection process is interoperable with the managed applications, meaning that the garbage collection process and the managed applications may be executed in interleaved time slices.

One aspect of interoperability concerns a used block of heap memory being marked and swept when a managed application is in the process of reading data from or writing data to that block. This may occur when the managed application's time slice ends as a read or write operation is being performed and the garbage collection process' time slice begins. In some embodiments, read and write barriers are used to help make the garbage collection process interoperable with the managed applications. The read or write barrier informs the garbage collection process that a particular block of heap memory is currently being used, preventing the garbage collection process from reclaiming the block of memory.

Instead of or in addition to using read and write barriers, the "mark/sweep" process could be modified into a "mark/mark-again/sweep" process. In this process, a block that is unmarked after a pass through the heap memory 300 is not immediately swept. Rather, the block is swept only if it remains unmarked after two consecutive passes through of the heap memory 300.

The various phases of the garbage collection process (scan the root set, mark blocks, sweep blocks) could each occur incrementally in multiple time slices. However, scanning the root set may not need to be implemented incrementally since the root set is bounded in size (number of registers, size of static memory, and worst-case size of a fully-allocated heap). Also, in particular embodiments, the sweep phase could be incremental and interoperable only if object "finalizers" are not executed when objects are deallocated. A finalizer represents a method used by an object to free resources and perform other "cleanup" operations before the memory occupied by the object is reclaimed.

During the garbage collection process, the memory manager 214 may encounter internal pointers used by applications being executed in the execution environment 200. Internal pointers are pointers that address locations within a block of heap memory other than the beginning of the block. The internal pointers create an issue with garbage collection because they can drive a severe design constraint. While a pointer to the beginning of a used block of heap memory is easier to identify, a pointer to an arbitrary place in the middle of an unknown-size structure can be difficult to characterize. In some conventional garbage collection processes, only pointers to the beginning of a heap block protected that heap block from reclamation. Other conventional garbage collection processes grouped blocks of allocatable memory into size clusters (frequently "pages" of memory) so that it was possible to compute the starting address of the block.

In some embodiments of this disclosure, each block in the heap memory 300 includes a size at the beginning and end of the block. This makes the heap memory 300 "walkable" or easily traversable from any known beginning of a block. In these embodiments, the start of a block for an arbitrary internal pointer can be located by starting at one end of the heap memory 300 and walking through the heap memory 300 until the block that encompasses the internal pointer is located.

In other embodiments, a portion of the management area 302 contains pointers into the heap area 304. For example, 40,000 bytes in the management area 302 could contain 10,000 pointers into the heap area 304. These pointers (referred to as "management pointers") are approximately evenly spaced, point to the beginnings of various blocks in the heap area 304, and are continuously maintained as new heap operations allocate and deallocate heap blocks. When it is time to locate the beginning of a block that contains an address referenced by an internal pointer, the following formulas may be used:

$$StartingIndex = (AddressToFind - HeapLowAddress) / TenThousanthHeapSize \quad (1)$$

$$StartingAddress = HeapBlockAddresses[StartingIndex] \quad (2)$$

where HeapBlockAddresses represents an array of 10,000 management pointers into the heap area 304, StartingIndex represents an index into the array of management pointers, AddressToFind represents the address referenced by the internal pointer, HeapLowAddress represents the lowest memory address of the heap area 304, TenThousanthHeapSize represents $\frac{1}{10,000}$th the size of the heap area 304, and StartingAddress represents the beginning of a block that either contains the address referenced by the internal pointer or is near the address referenced by the internal pointer. From StartingAddress, it is possible to use the sizes contained in the heap memory blocks to walk in either direction in the heap memory 300 to locate the beginning of the block that contains the address referenced by the internal pointer.

As mentioned above, scanning the root set may not be implemented in an incremental fashion in the execution environment 200. However, it may need to be performed incrementally, such as when many threads are running in the execution environment 200 (since each thread has a stack that is scanned). In some embodiments, scanning the root set 510 is initiated by a TellHmRootSet( ) API function call executed immediately after a heap memory 300 is initialized. TellHmRootSet( ) passes a function vector identifying multiple functions to the memory manager 214, which records the vector's contents for later. When a garbage collection cycle begins, the root set is obtained by executing (from within the memory manager 214) each of the functions in the saved vector.

In particular embodiments, six functions are passed through the vector, corresponding to six dynamic link libraries (DLLs) built as part of the XIMIAN/NOVELL MONO CLI. Each of the DLLs has a function named <dllname>GetRootSet, and addresses of these functions are passed via the vector. When the root set is needed at the beginning of a garbage collection cycle, these six functions (or however many functions are identified in the vector) are executed. Each DLL is the linked combination of many files, and the <dllname>GetRootSet function in turn calls a <file>GetRootSet function for each file included in the DLL. Each of these <file>GetRootSet functions makes zero or more calls to an AddReferenceExternal function of the memory manager 214, passing in the value of a pointer that exists within that code and that refers to a block that is "reachable" via that pointer. If every file tells the memory manager 214 about all pointer variables that it currently holds, the memory manager 214 is informed about all blocks that are "directly" reachable and which therefore constitute the "root set."

In addition to the <dll>GetRootSet functions, an additional function called StacksAndRegisters is used to inform the memory manager 214 about the stack and register contents of all threads. Since threads may come and go, this function may operate using a dynamically maintained thread table. After the root set is fully identified, the "marking" phase begins as described above.

While the execution environment 200 has been described up until now as using a single type of heap memory, multiple types of heap memories could be used in the execution environment 200. For example, the memory manager 214 could segregate a single heap memory into a short-term heap and a long-term heap, or the memory manager 214 could support the creation of separate short-term and long-term heaps. The short-term heap could provide support for shorter duration and higher-rate usage of memory. The long-term heap could provide support for longer duration or permanent usage of memory. A third type of heap could represent a conventional heap, which is accessed by unmanaged applications in a conventional manner (such as malloc and free commands).

To support the use of short-term and long-term heaps, the memory manager 214 could support a redirection mechanism to direct requests for heap memory to either the short-term heap or the long-term heap. For example, the GetMemoryFloating( ) and GetMemoryFixed( ) API function calls could be used to request a block of heap memory. The redirection mechanism determines whether the block of memory is provided from the short-term heap or the long-term heap. In some embodiments, a PushHeapSelection(STH/LTH) function is used to place either an "STH" or "LTH" indicator onto a special selection stack, and a PopHeapSelectiono function is used to remove the indicator from the special selection stack. If the "STH" indicator (such as a value of 0) is at the top of the special selection stack when the GetMemoryFloating( ) or GetMemoryFixed( ) API function call is made, a block of memory is allocated from the short-term heap. If the "LTH" indicator (such as a value of 1) is at the top of the special selection stack when the GetMemoryFloating( ) or GetMemoryFixed( ) API function call is made, a block of memory is allocated from the long-term heap. Alternatively, one of these two values (such as "LTH") could be used as a default, and only the other value (such as "STH") needs to be pushed and popped from the special selection stack. In this way, a managed application can control which heap is used for a particular memory allocation request. Also, the short-term heap may be quickly and repeatedly abandoned and reinitialized when it is no longer in use without affecting the long-term heap.

In some embodiments, the short-term heap and the long-term heap are managed in different ways. For example, different garbage collection processes could be used with the short-term heap and the long-term heap. As a particular example, the long-term heap could be managed as shown in FIGS. 9A through 9C, and the short-term heap could be managed as shown in FIGS. 10A through 10C.

Figure 9A:
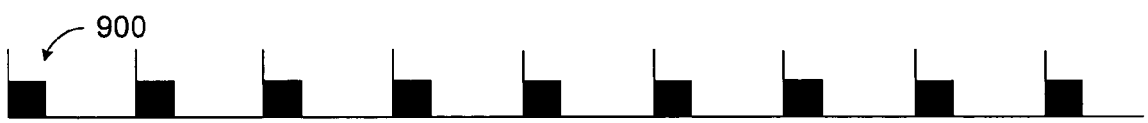
FIGS. 9A through 9C illustrate example timings of a garbage collection process in an execution environment according to one embodiment of this disclosure.
Figure 9B:
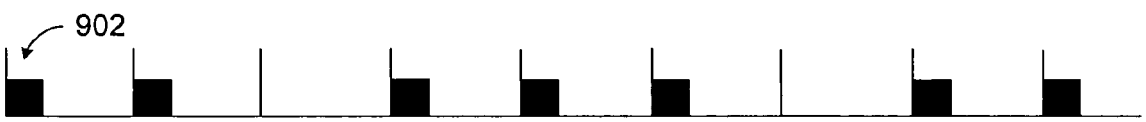
Figure 9C:
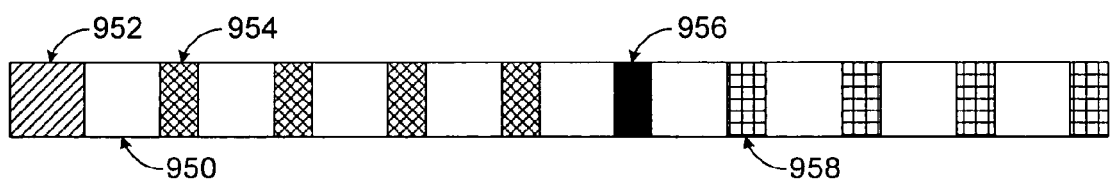
Figure 10A:
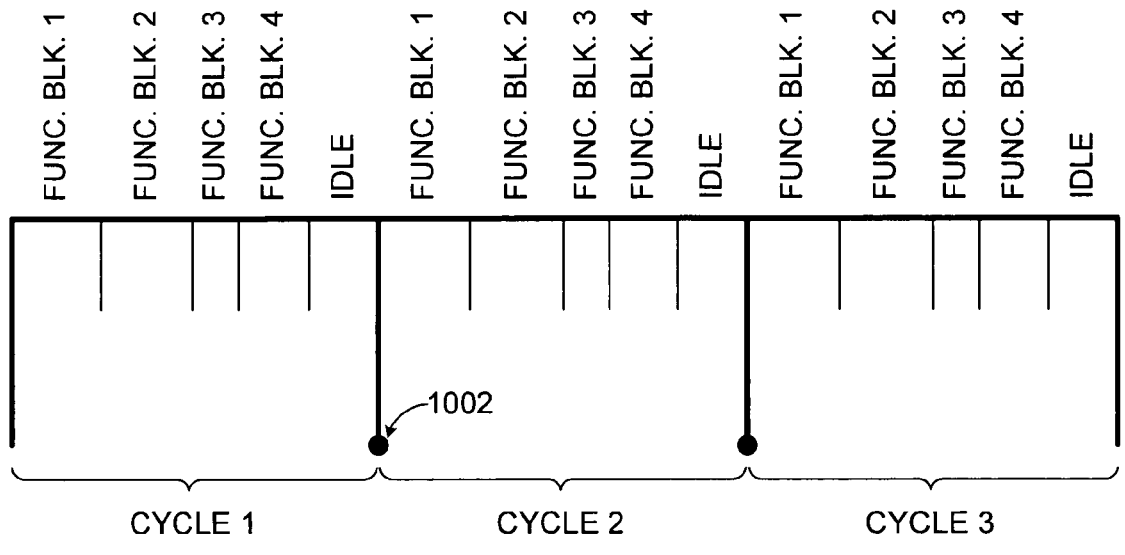
FIGS. 10A through 10C illustrate example timings of another garbage collection process in an execution environment according to one embodiment of this disclosure.
Figure 10B:
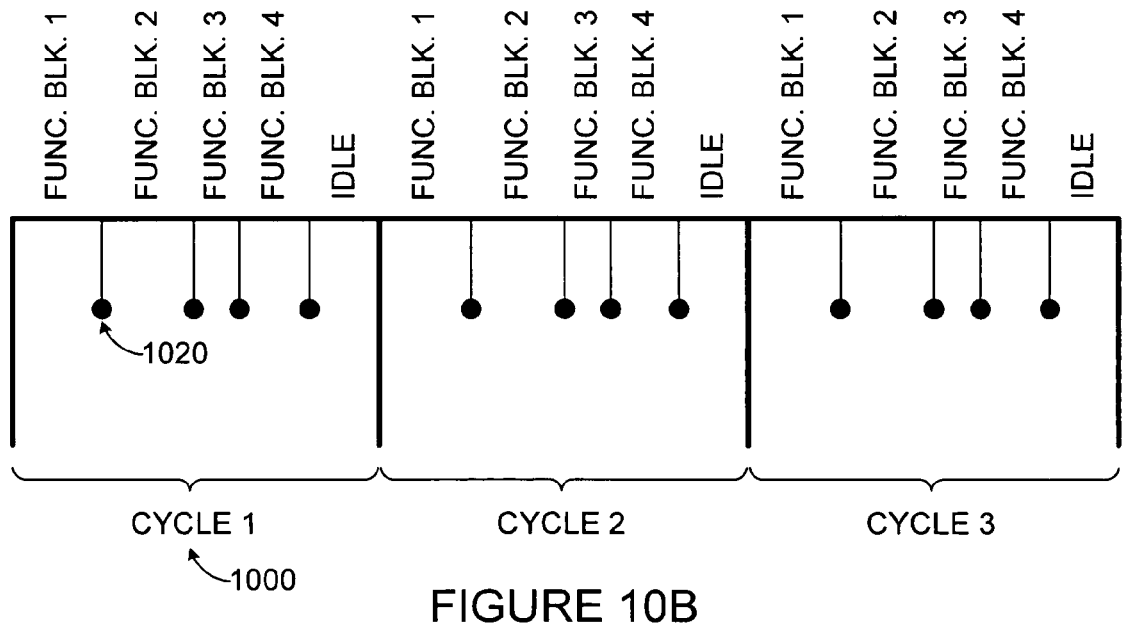
Figure 10C:
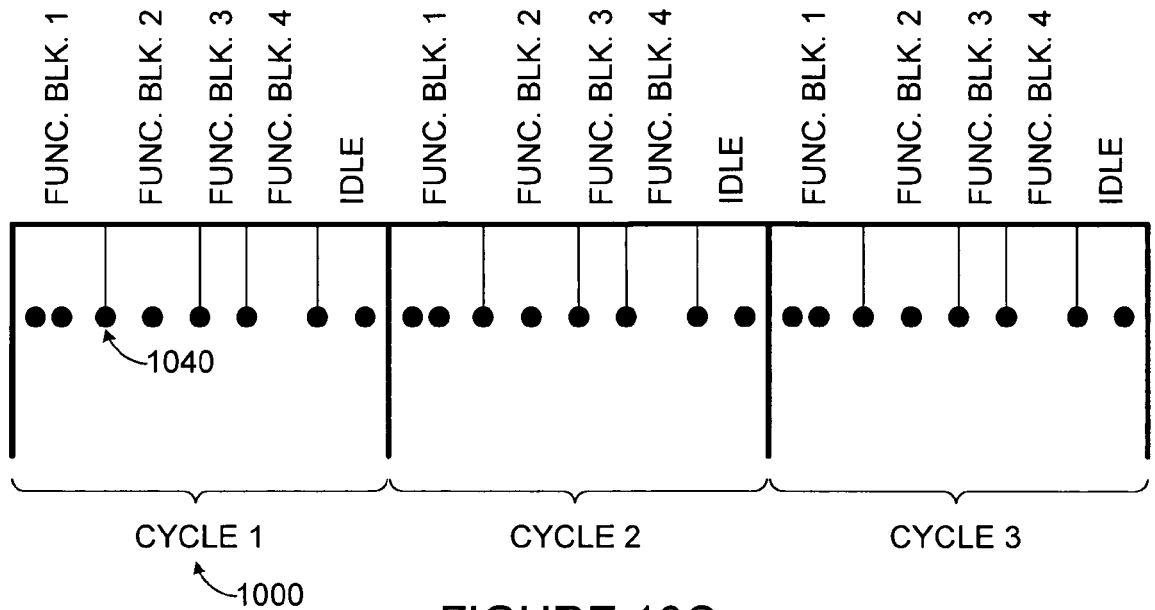

FIGS. 9A through 9C illustrate example timings of a garbage collection process in an execution environment according to one embodiment of this disclosure. In particular, FIGS. 9A through 9C illustrate how the garbage collection process may be performed incrementally in the background of the execution environment 200 for a long-term heap.

Conventional garbage collection processes typically operate continuously over a longer period of time. This would interfere with the execution of managed applications in the execution environment 200 and represents a non-deterministic way to perform garbage collection. As shown in FIGS. 9A and 9B, the garbage collection process in the execution environment 200 is broken up into various portions 900-902, which are invoked and executed periodically rather than all at once. FIG. 9A illustrates that the portions 900 of the garbage collection process are executed at a regular interval. FIG. 9B illustrates that the portions 902 of the garbage collection process may or may not be executed, but if executed the portions 902 are invoked at a regular interval. In FIG. 9B, a portion 902 of the garbage collection process may not be invoked at the regular interval, for example, if the free space in the heap memory 300 exceeds a specified percentage, such as 30%.

FIG. 9C illustrates one example of how the garbage collection process may be implemented incrementally in the execution environment 200. In particular, FIG. 9C illustrates how different non-adjacent time slices (whether evenly or unevenly spaced and fixed or variable durations) may be used in the execution environment 200. As shown in FIG. 9C, unshaded time slices 950 represent time slices used by managed applications being executed in the execution environment 200. The hatched time slice 952 is used by the garbage collection process to scan the root set 510 to identify any pointers that point to in-use heap blocks. The crosshatched time slices 954 are used by the garbage collection process to implement the marking phase, where the pointers are followed to identify indirect used heap blocks 502a-502e and direct used heap blocks 504a-504b.

Finalizers may or may not be allowed in the execution environment 200. If allowed, the solid time slice 956 is used to allow objects being reclaimed to invoke any finalizers. Also, rules may be established to ensure that users create finalizers capable of being executed within a specified amount of time (such as 0.5 ms). This helps to ensure that the execution of the finalizers is deterministic. In other embodiments, the use of finalizers in the execution environment 200 is not allowed.

In addition, the square hatched time slices 958 are used by the garbage collection process to implement the sweep phase, where allocated and unmarked heap blocks are reclaimed. While not shown in FIG. 9C, one or more time slices preceding time slice 952 could be used to unmark the blocks of the heap memory 300, or the unmarking could occur after the time slice 952 and before the first time slice 954.

By implementing the garbage collection process in this manner, the garbage collection process may be executed successfully in the background of the execution environment 200. Also, the garbage collection process may be executed without interfering with the managed applications in the execution environment 200.

In some embodiments, the garbage collection process requires the use of some space in the heap memory 300 being cleaned. For example, the garbage collection process may need to store the addresses of heap blocks, such as when the garbage collection process recursively examines all accessible heap blocks for references to other accessible heap blocks. As a result, the garbage collection process may be unable to execute if all blocks in the heap memory 300 are allocated to other applications or processes. To avoid this problem, the garbage collection process could be invoked when a specified amount of the heap memory 300 is allocated, such as 70% of the heap memory 300. This may help to avoid attempting to perform the garbage collection process when too little heap memory is free for use by the garbage collection process.

In particular embodiments, the reclamation of heap memory blocks is hidden from the managed applications in the execution environment 200. However, a managed application might wish to be made aware when the reclamation of particular memory blocks occurs. This may be supported with a callback mechanism in which a callback routine is associated with an individual block of heap memory. When that block of memory is freed either implicitly or explicitly, the callback routine is called with the address of the memory block being freed. Information from the callback routine may be used to update data structures used by the managed application. The API function call SetCallback( ) may be used to establish a callback routine for a particular block of heap memory, whether the block is indirectly or directly addressed.

FIGS. 10A through 10C illustrate example timings of another garbage collection process in an execution environment according to one embodiment of this disclosure. In particular, FIGS. 10A through 10C illustrate how a short-term heap may be abandoned and reinitialized in the background of the execution environment 200.

As shown in FIG. 10A, execution in the execution environment 200 is divided into multiple cycles 1000, each of which includes multiple time slices. The time slices in each cycle 1000 are used by different functional blocks (the managed applications), except for one idle period where housekeeping tasks such as heap management are performed.

In the example shown in FIG. 10A, abandonment and reinitialization of the short-term heap occur at the end of each cycle 1000. The circles 1002 shown in FIG. 10A illustrate when the abandonment and reinitialization of the short-term heap occur using this technique.

As shown in FIG. 10B, the short-term heap could also be abandoned and reinitialized at the end of the execution of each functional block. The circles 1020 shown in FIG. 10B illustrate when the abandonment and reinitialization of the short-term heap occur using this technique.

In addition, as shown in FIG. 10C, the short-term heap for a stack frame could be abandoned and reinitialized at the end of the execution of the method for which the stack frame was created. The circles 1040 shown in FIG. 10C illustrate when the abandonment and reinitialization of the short-term heap occur using this technique. In FIG. 10C, the short-term heap could be abandoned and reinitialized once at the end of the execution of a functional block or multiple times during execution of a functional block.

The various techniques shown in FIGS. 9A through 9C and 10A through 10C may be used by the memory manager 214 to manage a short-term heap and a long-term heap in the execution environment 200. However, the techniques shown in FIGS. 9A through 9C and 10A through 10C are for illustration only. The memory manager 214 could use any other or additional techniques to manage a heap memory. As a particular example, the memory manager 214 could use the technique shown in FIGS. 9A through 9C to manage both the short-term heap and the long-term heap.

Figure 11:
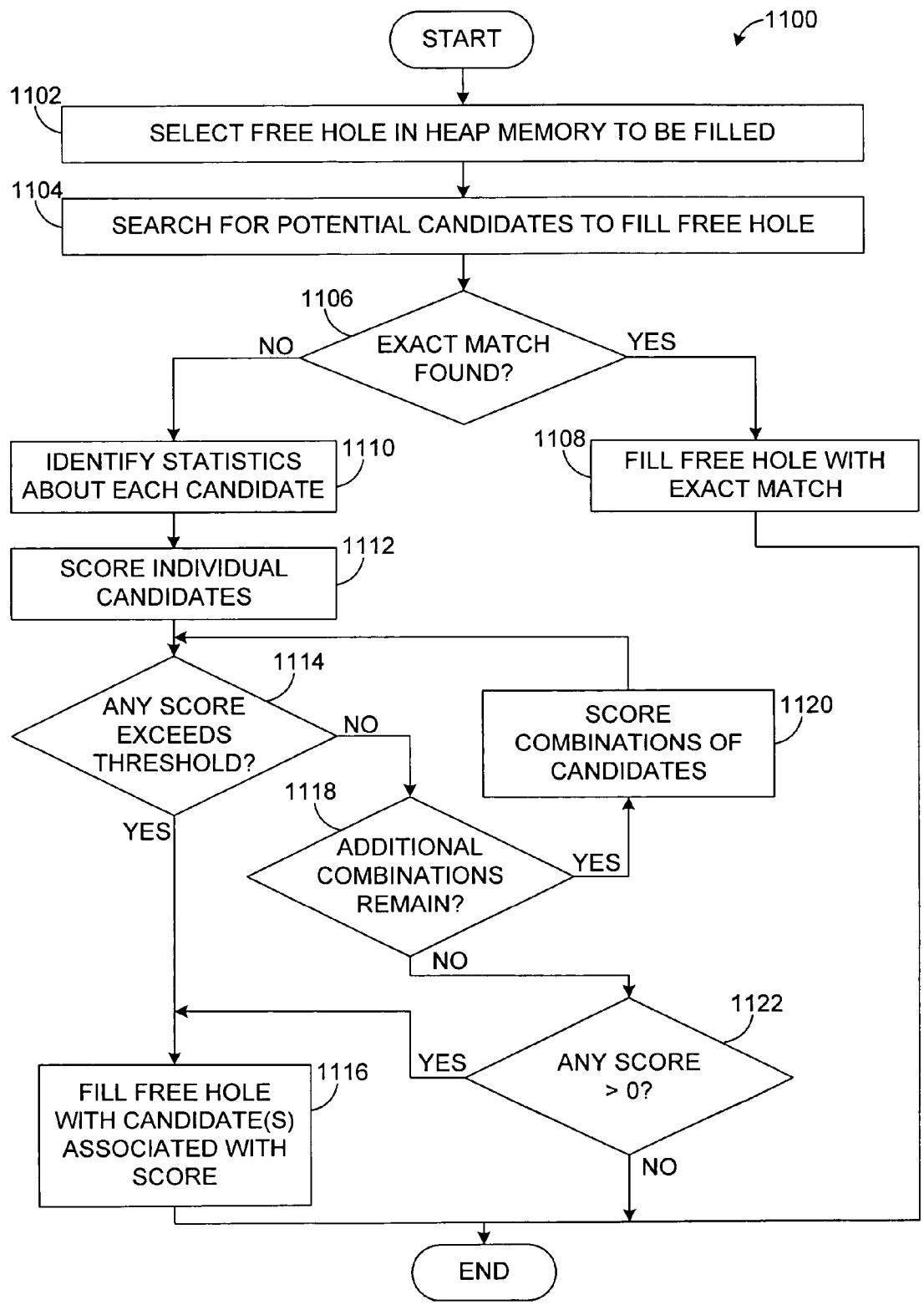
FIG. 11 illustrates an example method for defragmentation of a heap memory according to one embodiment of this disclosure.

FIG. 11 illustrates an example method 1100 for defragmentation of a heap memory according to one embodiment of this disclosure. For ease of explanation, the method 1100 is described with respect to the memory manager 214 of FIG. 2 managing the heap memory 300 shown in FIG. 3 (which operates as shown in FIGS. 4 through 6). The method 1100 could be used in any other suitable execution environment to manage any other suitable heap memory.

The defragmentation process performed by the memory manager 214 may or may not require time slicing in the way that the garbage collection process may require. The defragmentation process could involve as little as locating and filling one free block in the heap memory 300 with one or more used blocks. In some embodiments, the defragmentation process is invoked and instructed to perform as many defragmentation operations in a given, fixed amount of time. During that time, the defragmentation process need not inter-operate with applications being executed in the execution environment 200. This may reduce the need to use read and write barriers, which protect managed applications from wrongly accessing used blocks of memory that have been relocated during the defragmentation process.

In some embodiments, the defragmentation process involves moving relocatable used blocks (such as indirect used blocks 502a-502e) to fill in small free blocks of heap memory (such as free blocks 602) and create larger free blocks. The used blocks that are to be moved during the defragmentation process may be selected by one or more heuristics.

The heuristics may contain a number of parameters, including the number of free blocks neighboring a used block. Each used block may have zero, one, or two free blocks surrounding it. In particular embodiments, used blocks with two free neighbors are relocated because doing so allows the space occupied by the used block to be combined with both neighboring free blocks. This leads to the creation of one bigger block formed by coalescing all three blocks. Also, used blocks with one free neighbor could be relocated. Used blocks with no free neighbors may not be relocated during the defragmentation process.

Block size is also taken into consideration during the defragmentation process. Ideally, a free block in the heap memory is filled with one or more used blocks that fit perfectly into the free block. If that is not possible, the free block may be filled with one or more used blocks that almost fit into the free block. In addition, the age of the used blocks is considered before relocating the used blocks during the defragmentation process. In general, recently allocated blocks tend to have shorter lifetimes than non-recently allocated blocks. As a result, the memory manager 214 may not relocate recently allocated blocks during the defragmentation process because these memory blocks are new and have a statistical likelihood of being deallocated sooner.

The memory manager 214 selects a free hole (a free block 602) in the heap memory 300 to be filled at step 1102. For example, the free block 602 may be selected from one of the chains 604a-604n, where the chosen chain contains the smallest free blocks 602. In particular embodiments, the free block 602 selected is subject to the limitation that it cannot be more than four times the size of the largest used block capable of being relocated.

The memory manager 214 searches for used blocks (such as indirect used blocks 502a-502e) that are potential candidates for filling the selected free hole at step 1104. The search may be limited to used blocks that are not larger than the selected free block 602. The search may also be limited to used blocks with at least one free neighbor. In addition, the search may be confined to older allocated blocks. Blocks marked with the HEAP_MANAGER bit described above or a DO_NOT_RELOCATE bit in their headers are not considered during the defragmentation process, as are blocks neighboring the selected free block 602. In particular embodiments, the search continues until 15 potential candidates are located satisfying these criteria or until a certain amount of time has elapsed during the search.

The memory manager 214 determines if the search terminated upon an exact match at step 1106. The search performed at step 1104 may end immediately if a used block is found that is a perfect fit for the selected free block 602 and the used block has two free neighbors. If an exact match is found, the memory manager 214 fills the free hole with the matching used block at step 1108.

If no perfect fit is found during the search, the memory manager 214 analyzes the fifteen candidates found during the search to identify statistics of the candidates at step 1110. For each candidate used block, the memory manager 214 could identify the location of the used block, the age of the used block, the number of free neighbors of the used block, the total size of any free neighbors of the used block, and any over-allocation contained in the used block.

The memory manager 214 then scores each individual candidate at step 1112. An example algorithm for scoring a candidate or combination of candidates is provided below. In this algorithm, an exact match returns a higher score. Non-exact matches are scored based on their age in terms of garbage collection cycles, their number of free neighbors, and their sizes compared to the size of the selected free block 602.

These scores are compared to a threshold at step 1114. If any score exceeds the threshold, the individual candidate associated with that score is used to fill in the free hole at step 1116.

Otherwise, the memory manager 214 begins considering combinations of candidates to fill the free hole. In some embodiments, the memory manager 214 could use two, three, or four candidates to fill the free hole. The memory manager 214 determines at step 1118 if any additional combinations of candidates remain to be examined. If so, the memory manager 214 scores certain combinations of candidates at step 1120. At that point, steps 1114-1118 are repeated to determine if any combination of candidates can be used to fill the free hole in the heap memory 300.

As a particular example of how steps 1114-1120 may be implemented, if no individual candidate has a score that exceeds the threshold at step 1114, the memory manager 214 may score all combinations of two candidates at step 1120. If no combination of two candidates has a score that exceeds the threshold at step 1114, the memory manager 214 may score all combinations of three candidates at step 1120. If no combination of three candidates has a score that exceeds the threshold at step 1114, the memory manager 214 may score all combinations of four candidates at step 1120.

If no combination of candidates exceeds the threshold, the memory manager 214 determines if any non-zero score exists for any individual candidate or combination of candidates at step 1122. If so, the memory manager 214 picks the individual candidate or combination of candidates with the highest score, and that individual candidate or combination of candidates is used to fill the free hole at step 1116. Otherwise, all scores equal zero, and the memory manager 214 was unable to fill the free hole in the heap memory 300. At this point, the method 1100 may end with an exception indicating a failure of the defragmentation process.

As noted earlier, some blocks requested by applications may contain an over-allocation of space, meaning the block contains more space than requested by an application. A similar mechanism could be used during defragmentation. When the defragmentation process is relocating one or more used blocks to fill a free hole, the defragmentation process may sometimes find it advantageous to extend the size of a relocated block so that it entirely fills the free hole. This may occur, for example, when filling the free hole with an unextended used block would create a residual fragment of free space that is too small to tolerate. As with over-allocations that occur during allocation of a block to an application, over-allocations that occur during defragmentation may be recoverable during later defragmenting or if the block is ever deallocated. Also, if a block containing over-allocated space could be moved during defragmentation but cannot fit into a free hole in its entirety, the actual size of the block (without the over-allocated space) could be examined to determine if the actual size fits into the free space. If by eliminating the over-allocation the block fits into the free space, this provides the dual benefits of filling the free hole and recovering the over-allocated space.

The memory manager 214 may use any suitable scoring mechanism to score individual candidates and combination of candidates. The algorithm shown below could be used to score the candidate(s). A score of zero is returned for a situation that is not acceptable. Some of the factors considered in the algorithm (TotalLength, TotalAge, and TotalFreeNeighborSize) may be aggregates for between one and four used blocks.

```
const PERFECT_FIT_BONUS_POINTS           = 1000000000
const WEIGHT_FOR_TOTAL_FREE_NEIGHBORS    = 100000000
const WEIGHT_FOR_AGE                     = 10000000
const WEIGHT_FOR_RECOVERABLE_LONGWORDS   = 100000
const WEIGHT_FOR_GOODNESS_OF_FIT         = -WEIGHT_FOR_RECOVERABLE_LONGWORDS
const WEIGHT_FOR_SIZE_OF_FREE_NEIGHBORS = 1
// Check if candidate/combination of candidates is too big
if (TotalLength > ManagementArea.DefragHoleSize) return 0
// Check if candidate/combination of candidates has free neighbors
if (TotalFreeNeighbors == 0) return 0
// Check for goodness of fit.
ExcessLength = ManagementArea.DefragHoleSize - TotalLength
// Check for excessive amount of movement during defragmentation
if (ExcessLength >= MAXIMUM_OVERALLOCATION_DURING_DEFRAGMENTATION) return 0
// Compute points due to goodness of fit.
FitPoints = (ExcessLength == 0) ? PERFECT_FIT_BONUS_POINTS : ExcessLength *
WEIGHT_FOR_GOODNESS_OF_FIT
// Compute points due to age
AgePoints = TotalAge * WEIGHT_FOR_AGE;
// Compute points due to number of free neighbors. More is better
// This ranges from 0..8.
NeighborPoints = TotalFreeNeighbors * WEIGHT_FOR_TOTAL_FREE_NEIGHBORS
// Compute points due to combined size of free neighbors. More is better
NeighborSizePoints = TotalFreeNeighborSize *
WEIGHT_FOR_SIZE_OF_FREE_NEIGHBORS
// Compute points due to recovering longwords.
RecoverableLongwordsPoints = TotalRecoverableLongwords *
WEIGHT_FOR_RECOVERABLE_LONGWORDS
// Return the total score
return FitPoints + AgePoints + NeighborPoints + NeighborSizePoints +
RecoverableLongwordsPoints;
```

The heuristics used in the defragmentation process use a number of constants to define or control how the defragmentation process occurs. These constants may be defined in software or represent initialization-time configuration values.

The following describes these various constants and provides example values for the constants.

GC_CYCLE_AGE_BEFORE_RELOCATION=2: Relocating rently allocated blocks may not be worthwhile since these blocks are statistically more likely to be deallocated or garbage collected. This value identifies the minimum age (in garbage collection cycles) that a used block should meet before it is considered for relocation.

USED_BLOCKS_TO_ANALYZE_WHEN_DEFRAGGING=15: This value identifies the number of candidate used blocks to be identified.

MAXIMUM_BLOCK_SIZE_TO_MOVE_DURING_DEFRAGMENTATION=1000: This value identifies the maximum size of a block to be relocated. Moving large blocks of unconstrained size could be too time-consuming and therefore non-deterministic. Since a free hole may be filled with up to N used blocks, this value multiplied by N governs the largest free block to be filled. This particular value is specified in longwords.

USED_BLOCK_SEARCH_FAILURE_CANDIDATE_COUNT_DROPOFFRATE_=100: If the search for candidate used blocks takes an excessive amount of time, the required population to be considered may be reduced. This value identifies the number of used blocks that should be rejected as a candidate before the USED_BLOCKS_TO_ANALYZE_WHEN_DEFRAGGING value is adjusted. As an example, for every USED_BLOCK_SEARCH_FAILURE_CANDIDATE_COUNT_DROPOFF_RATE used blocks that are considered but disqualified, the number of used blocks being sought is reduced by one. The number of used blocks being sought is initially USED_BLOCKS_TO_ANALYZE_WHEN_DEFRAGGING, but this value is reduced by one whenever USED_BLOCK_SEARCH_FAILURE_CANDIDATE_COUNT_DROPOFF_RATE failures are encountered. The lower limit on this computation is one. This heuristic may be expressed as: UsedBlocksSought=USED_BLOCKS_TO_ANALYZE_WHEN_DEFRAGGING−(CountOfFailures/USED_BLOCK_SEARCH_FAILURE_CANDIDATE_COUNT_DROPOFF_RATE);

USED_BLOCK_SEARCH_FAILURE_NEAR_PERFECT_FIT_DROPOFF_RATE=1000: When searching for candidate used blocks, a "perfect fit" is desired, where one or more used blocks completely and exactly fill the free block. However, "near perfect fits" are also acceptable. The criterion for "perfectness" of fit is weakened when experiencing a high rate of disqualified used block candidates. Starting from zero (where a perfect fit is required), the criteria is increased by one for each USED_BLOCK_SEARCH_FAILURE_NEAR_PERFECT_FIT_DROPOFF_RATE failures encountered. The computation of how close to require the fit is expressed as: ExcessWordsTolerated=0+(CountOfFailures/USED_BLOCK_SEARCH_FAILURE_NEAR_PERFECT_FIT_DROPOFFRATE);

MAXIMUM_NEAR_PERFECT_FIT_CRITERIA=7: Notwithstanding the above relaxation of perfectness of fit, an unlimited level of poor fit may not be allowed when filling free blocks with relocated used blocks. This value controls the upper limit on ExcessWordsTolerated in the above computation.

Various weights may also be used during the scoring of the used block candidates. These weights represent the sums for all individual or combination of candidates under consideration.

Weighting for TotalLength—goodness of fit. A close fit is generally better.

Weighting for TotalAge—age. An older age is generally better.

Weighting for TotalFreeNeighbors—number of free neighbors. A larger number is generally better.

Weighting for TotalFreeNeighborSize—size of free neighbors. A bigger size is generally better.

Weighting for TotalRecoverableLongwords—over-allocations recovered. A larger amount is generally better.

In some embodiments, the garbage collection process and the defragmentation process are used in an alternating fashion to manage the heap memory 300. For example, small amounts of defragmentation may be alternated with occasional episodes of garbage collection. This allows the defragmentation and garbage collection processes to solve two different problems, both of which may contribute to the inability of a managed application to obtain memory when needed. Garbage collection frees used blocks that are no longer actually in use, while defragmentation removes small and typically bothersome free blocks and creates larger and more valuable free blocks.

Although FIGS. 3 through 11 illustrate an example heap memory and how a memory manager may manage the heap memory in a deterministic execution environment, various changes may be made to FIGS. 3 through 11. For example, while FIGS. 3 through 6 illustrate a particular heap memory and how the heap memory may be used, any other heap memory may be used in any suitable manner in the execution environment 200. Also, while FIGS. 7 through 11 illustrate particular mechanisms for managing a heap memory, any other or additional mechanisms could be used to manage the heap memory in the execution environment 200.

FIGS. 12 through 14 illustrate how assembly code may be managed and used in a deterministic execution environment. For ease of explanation, FIGS. 12 through 14 are discussed with respect to the code manager 212 and other components used in the execution environment 200 of FIG. 2.

FIG. 12 illustrates an example method 1200 for assembly code loading and compilation in an execution environment according to one embodiment of this disclosure. For ease of explanation, the method 1200 is described with respect to the execution environment 200 of FIG. 2. The method 1200 could be used in any other suitable execution environment.

New assembly code is downloaded into a file system of an execution environment at step 1202. This may include, for example, a user downloading the new assembly code into the global assembly cache 202 of the execution environment 200. The new assembly code could represent a new program or a different version of an existing program already loaded into the execution environment 200.

A load of the new assembly code is invoked at step 1204. This may include, for example, the user providing a command to the execution environment 200 requesting that the new assembly code be loaded into the execution environment 200. The command may be received by the code manager 212, which then causes the assembly loader 204 to attempt to load the new assembly code into the AOT compiler 206.

A determination is made as to whether the new assembly code associated with the load request is actually stored in the file system at step 1206. This may include, for example, the assembly loader 204 examining the global assembly cache 202 and determining if the requested assembly code is present in the global assembly cache 202. If the assembly code is missing, an exception is generated at step 1208, and the method 1200 ends.

Otherwise, the assembly code is present in the global assembly cache 202, and appropriate runtime data structures are loaded with the new assembly code at step 1210. This may include, for example, the assembly loader 204 loading the new assembly code into data structures of the AOT compiler 206. The data structures could represent any suitable data structures arranged to hold assembly code to be compiled in the execution environment 200.

The assembly code is then pre-compiled at step 1212. This may include, for example, the AOT compiler 206 compiling the assembly code into native executable code capable of being executed in the execution environment 200. The AOT compiler 206 may perform the compilation in the background of the execution environment 200. For example, the AOT compiler 206 could compile the assembly code in time slices not used by the managed applications being executed in the execution environment 200. Once the new assembly code is compiled into native executable code, the native executable code may be executed within the application domain 210 of the execution environment 200. Also, a hash table or other structure may be updated to reflect that the compiled assembly code is now available for use in the execution environment 200. The compiled assembly code could itself be stored in one or more locations in one or more hash tables or other structures.

FIG. 13 illustrates an example method 1300 for assembly code unloading in an execution environment according to one embodiment of this disclosure. For ease of explanation, the method 1300 is described with respect to the execution environment 200 of FIG. 2. The method 1300 could be used in any other suitable execution environment.

An unload of assembly code is invoked at step 1302. This may include, for example, a user providing a command to the execution environment 200 requesting that specific assembly code be unloaded from the execution environment 200. The command may be received by the code manager 212, which then controls the unloading of the assembly code.

A determination is made as to whether the execution environment currently operating is capable of unloading assembly code during operation at step 1304. This may include, for example, determining whether the execution environment 200 is currently operating. As a particular example, this may include determining whether a Net runtime environment is currently operating. If not, an exception is generated at step 1314, and the method 1300 ends.

If so, a determination is made as to whether any other problems are detected at step 1306. This may include, for example, the code manager 212 determining if the received unload command contained appropriate arguments, such as the name of the assembly code to be unloaded. This may also include the code manager 212 determining if the identified assembly code has been loaded into an application domain 210. This may further include the code manager 212 determining if the identified assembly code is domain neutral, meaning it can be invoked in multiple application domains 210. Beyond that, this may include the code manager 212 determining whether the identified assembly code represents a core assembly, or assembly code supporting a core or important function in the execution environment 200. In addition, this may include the code manager 212 determining if the identified assembly code has any active instances (whether the assembly code is currently being executed).

If the received unload command contains improper arguments, the identified assembly code has not been loaded into an application domain 210, or the identified assembly code is domain neutral, an exception is generated at step 1314, and the method 1300 ends. Similarly, if the identified assembly code represents a core assembly or if the identified assembly code has at least one active instance, an exception is generated at step 1314, and the method 1300 ends.

Otherwise, the assembly code is unloaded during steps 1308-1312. The code manager 212 removes references to the compiled assembly code from the appropriate hash table at step 1308. The code manager 212 closes any file handles identifying the compiled assembly code being unloaded at step 1310. The file handles are used in the execution environment 200 to track different files that are in use at the same time. The file handles closed by the code manager 212 may represent file handles used during execution of the compiled assembly code.

In addition, the code manager 212 further cleans runtime data structures at step 1312. The runtime data structures could, for example, represent data structures used to track which assembly codes have been loaded into working memory. When a compiled assembly code is removed from the hash table at step 1308, the runtime data structures may be used to identify where different portions of the assembly code are located. At this point, the assembly code has been unloaded, and the method 1300 ends.

FIG. 14 illustrates an example mechanism for tracking assembly code usage in an execution environment according to one embodiment of this disclosure. In particular, FIG. 14 illustrates a mechanism that may be used as part of step 1306 described above to determine if assembly code to be unloaded has any active instances.

In some embodiments, the memory manager 214 determines whether assembly code to be unloaded has any active instances. The memory manager 214 then informs the code manager 212 whether particular assembly code has any active instances, allowing the code manager 212 to decide whether the assembly code can be unloaded. In particular embodiments, the memory manager 214 lacks object manager functionality and therefore does not manage or track the creation and expiration of objects and instances. In these embodiments, the memory manager 214 could use the callback mechanism described above to track instances of assembly code being executed.

As shown in FIG. 14, for each assembly code that is loaded, the execution environment 200 (such as the code manager 212) maintains a structure 1402 containing information about the classes supported by that assembly code. A parallel phantom structure 1404 is also created, and the phantom structure 1404 contains a pointer to the original structure 1402. If a series of instances 1406*a*-1406*c* of the assembly code are created, each of the instances 1406*a*-1406*c* includes a pointer to the phantom structure 1404.

A pointer in the original structure 1402 is initialized to NULL when the assembly code is first loaded. When one or more active instances of the assembly code are in use, the pointer in the structure 1402 points to the phantom structure 1404. When no active instances of the assembly code are in use, the pointer in the structure 1402 is again set to NULL. However, the pointer in the original structure 1402 represents a "non-mark-traversing" pointer. This means the pointer does not constitute an active, traceable reference to the phantom structure 1404, so it is not traversed during the marking phase of the garbage collection process.

A callback routine 1408 is defined in the phantom structure 1404, and the callback routine 1408 is executed each time the phantom structure 1404 is deleted by the memory manager 214. The phantom structure 1404 may be deleted, for example, when the last instance (such as instance 1406c) of the assembly code is deleted. In the callback routine 1408, the pointer in the phantom structure 1404 is used to access the original structure 1402 and set the pointer in the original structure 1402 to NULL. In this way, the pointer in the original structure 1402 may be examined to determine if the pointer points to a phantom structure 1404 or has a NULL value. If the pointer in the original structure 1402 has a NULL value, there are no instances 1406a-1406c of the assembly code currently in use, and the assembly code may be safely unloaded.

In other embodiments, the original structure 1402 could use a counter that is incremented each time a new instance of the assembly code is created. A callback routine could then be used to decrement the counter each time an instance of the assembly code is deleted. In this way, the value of the counter may be examined to determine if there are any active instances of the assembly code. The pointer in the original structure 1402 shown in FIG. 14 could still be used when the original structure 1402 supports the counter in these embodiments.

Although FIGS. 12 through 14 illustrate how assembly code may be managed and used in a deterministic execution environment, various changes may be made to FIGS. 12 through 14. For example, while FIG. 14 illustrates one possible mechanism for tracking active instances of assembly code, other techniques could be used in the execution environment 200 to track active instances of assembly code.

FIG. 15 illustrates an example timing of program execution in an execution environment according to one embodiment of this disclosure. In particular, FIG. 15 illustrates how the execution of various managed applications and housekeeping tasks may be scheduled in the deterministic execution environment 200. For ease of explanation, FIG. 15 is discussed with respect to the scheduler 222 of FIG. 2.

In general, both the housekeeping tasks and the managed applications are scheduled for execution in the execution environment 200. The managed applications being executed could be cyclic in nature or be aperiodic (such as event driven or "one-shot" applications). Cyclic applications are categorized by the scheduler 222 into groups based on the amount of execution time needed by the applications. In this example, the groups include applications needing 5-20 ms (higher priority), 100-1000 ms (medium priority), or more than 10 seconds (lower priority). Event driven applications run on their own threads, are triggered by external events (such as network or user commands), are executed at a lower priority, and go dormant when execution is complete. One-shot applications are similar to event driven applications in behavior and priority, but the one-shot applications terminate when their execution is complete.

As shown in FIG. 15, the scheduler 222 schedules the execution of all categories of applications and housekeeping tasks. In this example, the unshaded time slices 1502 represent time slices used by the housekeeping tasks in the execution environment 200. The remaining time slices 1504-1510 are used by managed application (either cyclic or aperiodic) in the execution environment 200. The time slices 1502-1510 are arranged in order of decreasing priority in FIG. 15, with the time slices 1502-1504 having the highest priorities and the time slices 1510 having the lowest priorities.

In some embodiments, the amount of time spent executing a housekeeping task in a time slice 1502 is configurable, such as by being set to 20% of the smallest possible time slice 1502. Also, the housekeeping task being executed in a time slice 1502 may be guaranteed to reach a clean point on or before the expiration of the time slice 1502. A managed application executing in one of the time slices 1504-1510 may or may not reach a clean point before being preempted by the housekeeping task in a time slice 1502. As noted above, read and write barriers may be used to prevent a housekeeping task from moving or discarding a block of heap memory being used by a managed application. The establishment of the read and write barriers could be handled automatically in the execution environment 200, such as when the AOT compiler 206 inserts the commands:

---

Set DoNotRelocate bit // Enable Read Barrier
IF Instruction is a Write
    THEN { Execute Write-Barrier }
Original code
Clear DoNotRelocate bit // Disable Read Barrier

--- before and after original assembly code to create and remove the barriers. In other embodiments, interrupts are disabled or enabled to form or remove a barrier, respectively.

The various applications and housekeeping tasks executed in the time slices 1502-1510 have associated priorities. Table 1 illustrates how the priorities used in the execution environment 200 (EE) map to priorities in the WINDOWS and INTEGRITY operating systems.

TABLE 1

| EE Priority | Windows | Integrity |
| --- | --- | --- |
| Highest | High | 127 |
| Above Normal | Above Normal | 100 |
| Normal | Normal | 75 |
| Below Normal | Below Normal | 40 |
| Lowest | Low | 16 |

In some embodiments, the "Real-Time" priority in the WINDOWS operating system and priorities 128-255 in the INTEGRITY operating system are higher than any priorities of the managed applications or housekeeping tasks in the execution environment 200. These priorities may be used by the operating system for other services and tasks.

When the execution environment 200 is first invoked, it is launched on a high priority thread (the "Highest" priority). This thread executes initialization code for the execution environment 200. Once initialization is complete, this thread creates a thread for the scheduler 222 at the same priority level (Highest) and then goes into a "Wait-State". This thread remains in the wait-state until the scheduler thread exits. At that point, the thread terminates, which represents a shutdown of the execution environment 200.

The scheduler thread may create other managed threads at any priority level it desires. Threads with equal priority levels are scheduled in a round-robin fashion. The housekeeping tasks are called by the scheduler thread periodically while all other managed threads are preempted. Table 2 gives an example of a threading model that could be supported by the scheduler 222 and used in the execution environment 200.

TABLE 2

| Application Type | Description | Example | Priority | Terminates | Written as Managed Code |
|---|---|---|---|---|---|
| ISR | I/O Driver | Device management | Real-Time | Yes | No |
| System Services | OS controlled services | Network, File-system, Kernel services, etc. | All priority levels | Yes/No | No |
| Execution Environment | Housekeeping tasks | Heap mgmt, Assembly load/unload, Check-pointing, etc. | Highest | No | No |
| Fast Periodic | Scheduled based on cycles | 5 ms cyclic managed apps | Highest | No | Yes |
| Slow Periodic | Scheduled based on cycles | 100 ms, 10 s managed apps | Above Normal, Normal | No | Yes |
| Event Driven | Scheduled by managed apps, semaphores, etc. | Response to user commands such as call-up of a status display | Normal, Below Normal | No | Yes |
| Aperiodic | Created by managed apps or scheduler | Customer Loop Tuner | Below Normal, Low | Yes | Yes |

As shown here, both managed code (such as C# and Visual Basic) and unmanaged code (such as C and C++) may coexist in the execution environment 200 and share a common memory resource like a heap memory. For example, some unmanaged code may run at a very high priority level (such as ISRs and time-critical, time-based, or event-based responders). Also, unmanaged code may not interact with data structures (including managed heap memory) that is owned and managed by managed code. This is because managed code can be preempted by unmanaged code at times when the data structures are inconsistent or otherwise not ready for immediate use. In addition, both terminating and un-terminating code may exist in the execution environment 200 (keeping in mind that all code terminates during a shutdown).

Although FIG. 15 illustrates one example of the timing of program execution in an execution environment 200, various changes may be made to FIG. 15. For example, the scheduler 222 could classify the managed applications into any suitable number of categories. Also, the example timing shown in FIG. 15 is for illustration and explanation only. The scheduler 222 could schedule threads for execution in any other suitable manner.

In some embodiments, the various functions performed within or in conjunction with the execution environment 200 are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM) random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
   executing one or more applications in a deterministic execution environment, wherein the deterministic execution environment comprises functions that are bounded in terms of resource utilization and execution time, and wherein the deterministic execution environment is associated with a memory comprising at least one indirectly-accessed relocatable memory block identified through at least one pre-allocated connector and at least one directly-accessed non-relocatable memory block, the memory blocks arranged into a plurality of chains, each chain anchored by a corresponding anchor, each anchor comprising a size indicator that identifies a smallest block in the corresponding chain, the anchors sorted based on the size indicators; and executing a plurality of background tasks in the deterministic execution environment, the one or more applications and the background tasks executed in different time slots;

wherein at least one of the background tasks is executed incrementally in multiple non-adjacent time slots so as to prevent the at least one background task from interfering with the execution of the one or more applications; and wherein, upon a determination that at least one of the one or more applications requires an amount of memory, a scan is performed to locate one of the anchors identifying enough free space in the memory to satisfy the amount of memory required by the at least one application.

2. The method of claim 1, wherein the background tasks comprise a garbage collection process and a defragmentation process.

3. The method of claim 2, wherein the defragmentation process comprises:
identifying a free hole in the memory, the memory comprising memory blocks allocated to the one or more applications including the at least one indirectly-accessed relocatable memory block and the at least one directly-accessed non-relocatable memory block;
identifying a plurality of candidate memory blocks that could be relocated into the free hole;
selecting one or more of the candidate memory blocks; and
relocating the one or more selected candidate memory blocks into the free hole.

4. The method of claim 3, wherein:
each of the one or more candidate memory blocks has at least one unallocated neighboring block; and
selecting one or more of the candidate memory blocks comprises:
scoring at least one of (i) one or more individual candidate memory blocks and (ii) one or more combinations of candidate memory blocks; and
selecting either one of the individual candidate memory blocks or one of the combinations of candidate memory blocks for relocation if the associated score exceeds a threshold.

5. The method of claim 2, wherein the garbage collection process comprises:
identifying references to the memory, the memory comprising memory blocks allocated to the one or more applications including the at least one indirectly-accessed relocatable memory block and the at least one directly-accessed non-relocatable memory block;
marking one or more memory blocks associated with the identified references; and
reclaiming any unmarked memory blocks in the memory.

6. The method of claim 5, wherein:
the memory comprises a short-term heap and a long-term heap;
the identifying, marking, and reclaiming steps are performed on the long-term heap; and
the garbage collection process repeatedly abandons and reinitializes the short-term heap.

7. The method of claim 2, wherein:
the defragmentation process is executed in a single one of the time slots;
the garbage collection process is executed incrementally in multiple ones of the time slots; and the garbage collection process and the defragmentation process are executed in an alternating fashion.

8. The method of claim 1, wherein the background tasks comprise an assembly code loading process, an assembly code unloading process, and an assembly code compilation process.

9. The method of claim 8, wherein the assembly code compilation process compiles assembly code when the assembly code is loaded into the execution environment and before execution of the assembly code is requested.

10. The method of claim 1, further comprising scheduling execution of the background tasks in the time slots using a scheduler having a high priority;
wherein the scheduler preempts any application having a lower priority; and
wherein the scheduler and any application having an equal priority are scheduled in a round-robin fashion.

11. The method of claim 1, wherein the one or more applications and the background tasks are prevented from using functions and class libraries that are not bounded in terms of resource utilization and execution time.

12. The method of claim 1, wherein the one or more applications comprise at least one real-time application.

13. An apparatus comprising at least one processor that executes:
a deterministic execution environment configured to execute one or more applications and a plurality of background tasks, the one or more applications and the background tasks executed in different time slots, wherein the deterministic execution environment comprises functions or libraries that are bounded in terms of resource utilization and execution time, and wherein the deterministic execution environment is associated with a memory comprising at least one indirectly-accessed relocatable memory block identified through at least one pre-allocated connector and at least one directly-accessed non-relocatable memory block, the memory blocks arranged into a plurality of chains, each chain anchored by a corresponding anchor, each anchor comprising a size indicator that identifies a smallest block in the corresponding chain, the anchors sorted based on the size indicators;
a scheduler configured to schedule execution of the one or more applications and the background tasks, wherein at least one of the background tasks cannot be completed within a single time slot and is executed incrementally in multiple non-adjacent time slots so as to prevent the at least one background task from interfering with the execution of the one or more applications; and
a memory manager configured, upon a determination that at least one of the one or more applications requires an amount of memory, to perform a scan to locate one of the anchors identifying enough free space in the memory to satisfy the amount of memory required by the at least one application.

14. The apparatus of claim 13, wherein the background tasks comprise a garbage collection process and a defragmentation process.

15. The apparatus of claim 14, wherein to execute the defragmentation process of the background tasks, the deterministic execution environment is further configured to:
identify a free hole in the memory, the memory comprising memory blocks allocated to the one or more applications including the at least one indirectly-accessed relocatable memory block and the at least one directly-accessed non-relocatable memory block;

identify a plurality of candidate memory blocks that could be relocated into the free hole;
select one or more of the candidate memory blocks; and
relocate the one or more selected candidate memory blocks into the free hole.

16. The apparatus of claim 15, wherein:
each of the one or more candidate memory blocks has at least one unallocated neighboring block; and
to select the one or more of the candidate memory blocks, the deterministic execution environment is further configured to:
score at least one of (i) one or more individual candidate memory blocks and (ii) one or more combinations of candidate memory blocks; and
select either one of the individual candidate memory blocks or one of the combinations of candidate memory blocks for relocation if the associated score exceeds a threshold.

17. The apparatus of claim 14, wherein to execute the garbage collection process of the background tasks, the deterministic execution environment is further configured to:
identify references to the memory, the memory comprising memory blocks allocated to the one or more applications including the at least one indirectly-accessed relocatable memory block and the at least one directly-accessed non-relocatable memory block;
mark one or more memory blocks associated with the identified references; and
reclaim any unmarked memory blocks in the memory.

18. The apparatus of claim 17, wherein:
the memory comprises a short-term heap and a long-term heap;
the identify, mark, and reclaim operations are performed on the long-term heap; and
the garbage collection process repeatedly abandons and reinitializes the short-term heap.

19. The apparatus of claim 13, wherein the background tasks comprise an assembly code loading process, an assembly code unloading process, and an assembly code compilation process.

20. The apparatus of claim 19, wherein the assembly code compilation process is configured to compile assembly code when the assembly code is loaded into the execution environment and before execution of the assembly code is requested.

21. The apparatus of claim 13, wherein:
the scheduler has a high priority;
the scheduler is configured to preempt any application having a lower priority; and
the scheduler and any application having an equal priority are scheduled in a round-robin fashion.

22. The apparatus of claim 13, wherein the one or more applications and the background tasks are prevented from using functions and class libraries that are not bounded in terms of resource utilization and execution time.

23. A non-transitory computer readable medium encoded with a computer program, the computer program comprising computer readable program code for:
executing one or more applications in a deterministic execution environment, wherein the deterministic execution environment comprises functions or libraries that are bounded in terms of resource utilization and execution time, and wherein the deterministic execution environment is associated with a memory comprising at least one indirectly-accessed relocatable memory block identified through at least one pre-allocated connector and at least one directly-accessed non-relocatable memory block, the memory blocks arranged into a plurality of chains, each chain anchored by a corresponding anchor, each anchor comprising a size indicator that identifies a smallest block in the corresponding chain, the anchors sorted based on the size indicators;
executing a plurality of background tasks in the deterministic execution environment, the one or more applications and the background tasks executed in different time slots; and
upon a determination that at least one of the one or more applications requires an amount of memory, scanning to locate one of the anchors identifying enough free space in the memory to satisfy the amount of memory required by the at least one application;
wherein at least one of the background tasks cannot be completed within a single time slot and is executed incrementally in multiple non-adjacent time slots so as to prevent the at least one background task from interfering with the execution of the one or more applications.

* * * * *